US012286889B2

(12) United States Patent
Natarajan et al.

(10) Patent No.: US 12,286,889 B2
(45) Date of Patent: Apr. 29, 2025

(54) METHODS AND APPARATUS TO IMPROVE FAN OPERABILITY CONTROL USING SMART MATERIALS

(71) Applicant: General Electric Company, Schenectady, NY (US)

(72) Inventors: Avinash Natarajan, Bengaluru (IN); Vishnu Vardhan Venkata Tatiparthi, Bengaluru (IN); Ravindra Shankar Ganiger, Bengaluru (IN); Nagashiresha G, Bengaluru (IN); Prateek Mathur, Chennai (IN); Michał Tomasz Kuropatwa, Warsaw (PL); Arthur W Sibbach, Boxford, MA (US)

(73) Assignees: General Electric Company Polska sp. z o.o., Warsaw (PL); General Electric Company, Evendale, OH (US)

(*) Notice: Subject to any disclaimer, the term of this patent is extended or adjusted under 35 U.S.C. 154(b) by 0 days.

(21) Appl. No.: 18/350,496

(22) Filed: Jul. 11, 2023

(65) Prior Publication Data

US 2025/0020068 A1 Jan. 16, 2025

(51) Int. Cl.

*B64C 23/00* (2006.01)
*F01D 9/04* (2006.01)
*F01D 21/00* (2006.01)

(52) U.S. Cl.

CPC ........... *F01D 21/003* (2013.01); *F01D 9/041* (2013.01); *F05D 2240/127* (2013.01); *F05D 2240/128* (2013.01); *F05D 2270/301* (2013.01); *F05D 2270/334* (2013.01); *F05D 2300/505* (2013.01)

(58) Field of Classification Search

CPC ......... B64C 23/00; B64C 23/04; B64C 23/06; F01D 21/003; F05D 2240/127

See application file for complete search history.

(56) References Cited

U.S. PATENT DOCUMENTS

| | | | |
|---|---|---|---|
| 5,788,191 A | 8/1998 | Wake et al. | |
| 6,151,897 A | 11/2000 | Baumbick | |
| 6,207,940 B1 | 3/2001 | Feher et al. | |
| 7,114,911 B2 | 10/2006 | Martin et al. | |
| 8,043,045 B2 | 10/2011 | Clark et al. | |
| 9,638,176 B2 * | 5/2017 | Shivashankara | B64C 23/06 |
| 10,378,554 B2 | 8/2019 | Yu et al. | |
| 10,428,825 B2 | 10/2019 | Staroselsky et al. | |
| 10,662,803 B2 | 5/2020 | Mears | |
| 10,815,886 B2 | 10/2020 | Kroger et al. | |

(Continued)

FOREIGN PATENT DOCUMENTS

| | | | |
|---|---|---|---|
| WO | WO-2005100752 A1 * | 10/2005 | F01D 25/30 |
| WO | WO-2013088068 A1 * | 6/2013 | B64C 21/10 |

*Primary Examiner* — David E Sosnowski
*Assistant Examiner* — Maxime M Adjagbe
(74) *Attorney, Agent, or Firm* — HANLEY, FLIGHT & ZIMMERMAN, LLC

(57) ABSTRACT

Systems, apparatus, articles of manufacture, and methods are disclosed to improve fan operability control using smart materials. An engine comprising an engine surface in an airflow path, a sensor positioned on the engine surface, and a smart-material-based feature positioned on the engine surface, the smart-material-based feature triggered to modify the airflow path when the sensor outputs an indication of a detected deviation from a reference value of an operating parameter of the engine.

20 Claims, 18 Drawing Sheets

(56) References Cited

U.S. PATENT DOCUMENTS

| | | | | |
|---|---|---|---|---|
| 11,085,372 | B2 | 8/2021 | Mackin et al. | |
| 11,247,770 | B2 | 2/2022 | Cary et al. | |
| 11,480,063 | B1 | 10/2022 | Miller et al. | |
| 2008/0145204 | A1 | 6/2008 | Clark et al. | |
| 2009/0155067 | A1* | 6/2009 | Haas | B64D 33/02<br>415/208.1 |
| 2017/0298758 | A1 | 10/2017 | Mears | |
| 2021/0003075 | A1 | 1/2021 | Lincoln et al. | |
| 2022/0333553 | A1 | 10/2022 | Zatorski et al. | |
| 2022/0340265 | A1* | 10/2022 | Calkins | B64C 23/06 |
| 2022/0411046 | A1 | 12/2022 | Nino et al. | |

* cited by examiner

METHODS AND APPARATUS TO IMPROVE FAN OPERABILITY CONTROL USING SMART MATERIALS

FIELD OF THE DISCLOSURE

This disclosure relates generally to gas turbine engines and, more particularly, to methods and apparatus to improve air flow in a gas turbine engine.

BACKGROUND

In recent years, some engine designs use nacelles with shortened inlets to save size, weight, etc. However, nacelles with shortened inlets typically experience inlet distortion at the fan due to insufficient space in front of the fan to align the air flow.

Figure 1:
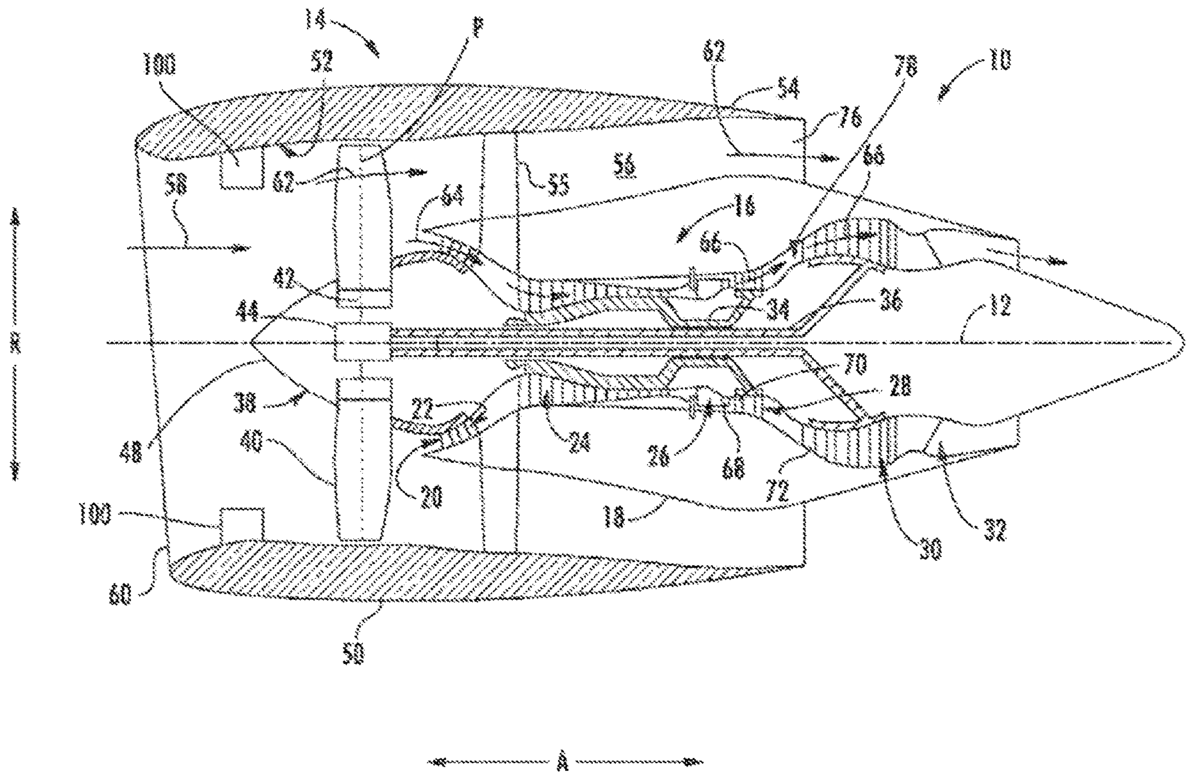
FIG. 1 is a schematic cross-sectional view of an example gas turbine engine in which examples disclosed herein may be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe example implementations and not to be taken limiting on the scope of the subject matter described in this disclosure. Certain features from different aspects of the following description may be combined to form yet new aspects of the subject matter discussed below.

As used in this disclosure, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

During the operation of gas turbine engines, engine systems experience blade flutter or stall due disturbances in a flowpath of air, shortened nacelles, different air streams, and other factors. Some engine designs use nacelles with shortened inlets to save size, weight, etc. However, nacelles with shortened inlets typically experience inlet distortion at the fan due to insufficient space in front of the fan to align the air flow. Blade flutter is introduced when there are disturbances in the air flow across and/or around an air foil or other aircraft surface. An aircraft that is attempting to take-off or land in a crosswind situation is likely to experience blade flutter due to the disturbances in the air flow created by the cross winds. Likewise, blade flutter can occur when there are two different air streams with different velocities or pressures mixing together. This can occur at an engine nozzle, where two different airflow paths converge. Certain examples, employ smart materials to minimize or otherwise reduce blade flutter or stall depending on engine pressure, speed, vibration data and other operating parameters. For example, smart materials can be embedded in a fan casing, fan blade and/or inlet cone.

Sensors that monitor engine pressure, vibration, speed data, and/or other operating parameters can be mounted on a fan hub and/or the fan casing behind a rotor, for example. Deviation from a reference value or range for one or more operating parameters activates smart materials to mitigate blade flutter and inlet distortion caused by an incoming air flow by changing a direction of the air flow. Smart materials are materials made of substances such as a shape memory alloy, a bi-metal material, a graphene-based element, or a composite foam, etc., that may be activated to, for example, extend an active vortex generator or create serrations on the engine by exposure to electricity, electromagnetic waves, microwaves, graphene-based heating elements, etc. Smart materials can create serrations on the fan casing and/or dendritic features on the fan blade, for example, and are adapted to mitigate inlet distortion, blade flutter and/or bend or tip clearance issues. For instance, smart materials made of graphene-based heating elements, bi-metallics, composite metal foams, and/or shape memory alloy are activated using electromagnetic (EM) waves (e.g., laser, ultraviolet (UV), infrared, etc.) and/or microwaves to produce quick and effective heating.

Serrations are made of different shapes, such as criss-cross, scallop-like, or saw-like shapes, that protrude and create turbulence to the flow. In some examples, a dendritic (e.g., leaf-like) structure with branches can span across a fan blade. Furthermore, branches connect leading edge and trailing edge or radial passages from blade root to blade tip. A larger dendritic pattern may include one or more axial ply and/or criss-cross patterns.

In some examples, activation of smart materials can occur at a local area to counter detrimental changes (e.g., bend, dent, flutter) in a particular area. In other examples, activation of smart materials extends across an entire surface (e.g., an interior surface (also referred to herein as an inner surface, indicative of a surface facing inward toward a center of the engine) of a fan casing, an exterior surface (also referred to herein as an outer surface, indicative of a surface facing outward away from a center of an engine) of a fan blade, an interior surface of a nozzle, an exterior surface of a nozzle, a surface of an inlet guide vane, a surface of an exit guide vane, etc.).

An example smart-material-based feature includes a retractable active vortex generator with one or more bi-metal material or shape memory alloy (SMA) actuators, as known as smart material actuators. Such retractable active vortex generators can be positioned on a fan casing and/or inlet nose cone of an engine to create turbulence to mitigate cross wind conditions. Local activation of smart materials on the fan blade and/or other structure (e.g., fan casing, inlet guide vane, etc.), using smart materials (e.g., materials made of shape memory alloy, bi-metal material, etc.) at a certain angle of attack to change the surface features of the blade, creates a turbulence and avoids boundary layer separation, which mitigates inlet distortion. Smart material activation is placed inside the casing using graphene heating elements which are then activated or otherwise triggered using electromagnetic waves (EM waves such as laser, ultraviolet (UV), infrared, etc.) and microwaves.

In operation, effects such as fan flutter, fan blade denting, and/or non-optimal tip clearance are mitigated by activating a given segment or local area of the blade to counter the damage induced in the form of bending, denting, and/or blade flutter. Mitigating elements such as smart materials can be applied to a ducted fan and/or an open rotor architecture on various structures.

FIG. 1 is a schematic cross-sectional view of an example gas turbine engine in which examples disclosed herein may be implemented. Particularly, for the example of FIG. 1, the gas turbine engine is a high-bypass turbofan jet engine 10, referred to herein as “turbofan engine 10”. The turbofan engine 10 has a ducted or closed-rotor design. As shown in FIG. 1, the turbofan engine 10 defines an axial direction A (extending parallel to a longitudinal axis 12 provided for reference), a radial direction R, and a circumferential direction. In general, the turbofan engine 10 includes a fan section 14 and a turbomachine 16 disposed downstream from the fan section 14.

The turbomachine 16 depicted generally includes a substantially outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a nozzle 32. A high pressure (HP) shaft 34 drivingly connects the HP turbine 28 to the HP compressor 24. A low pressure (LP) shaft 36 drivingly connects the LP turbine 30 to the LP compressor 22. The LP turbine 30 may also be referred to as a “drive turbine”.

In FIG. 1, the fan section 14 includes a fan 38 having a plurality of fan blades 40 coupled to a disk 42 in a spaced apart manner. More specifically, the fan section 14 includes the fan 38, housing a single stage of fan blades 40. As depicted, the fan blades 40 extend outwardly from disk 42 generally along the radial direction R. Each of the fan blades 40 is rotatable relative to the disk 42 about a pitch axis P by virtue of the fan blades 40 being operatively coupled to an actuation member 44 configured to collectively vary the pitch of the fan blades 40 in unison. The fan 38 is mechanically coupled to and rotatable with the LP turbine 30, or drive turbine. More specifically, the fan blades 40, disk 42, and actuation member 44 are together rotatable about the longitudinal axis 12 by LP shaft 36 in a “direct drive” configuration. Accordingly, the fan 38 is coupled with the LP turbine 30 in a manner such that the fan 38 is rotatable by the LP turbine 30 at the same rotational speed as the LP turbine 30.

Referring still to FIG. 1, the disk 42 is covered by rotatable front hub 48 aerodynamically contoured to promote an airflow through the plurality of fan blades 40.

Additionally, the fan section 14 includes a fan casing 50 that circumferentially surrounds the plurality of fan blades 40 of the fan 38 and/or at least a portion of the turbomachine 16. More specifically, the fan casing 50 includes an inner wall 52 and a downstream section 54 of the inner wall 52 of the fan casing 50 extends over an outer portion of the turbomachine 16 so as to define a bypass airflow passage 56 therebetween. Additionally, for the example depicted, the fan casing 50 is supported relative to the turbomachine 16 by a plurality of circumferentially spaced outlet guide vanes 55.

During operation of the turbofan engine 10, a volume of air 58 enters the turbofan engine 10 through an associated inlet 60 of the fan casing 50 and/or fan section 14. As the volume of air 58 passes across the fan blades 40, a first portion of the air 58 as indicated by arrows is directed or routed into the bypass airflow passage 56 and a second portion of the air 58 as indicated by arrow is directed or routed into the LP compressor 22. The pressure of the second portion of air 64 is then increased as it is routed through the high pressure (HP) compressor 24 and into the combustion section 26, where it is mixed with fuel and burned to provide combustion gases 66.

The combustion gases 66 are routed through the nozzle 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the nozzle 32 at least partially define a hot gas path 78 for routing the combustion gases 66 through the turbomachine 16.

It should be appreciated, however, that the turbofan engine 10 depicted in FIG. 1 and described above is by way of example only, and that in other examples, the turbofan engine 10 may have any other configuration. In other examples, the turbomachine 16 may include any other number of compressors, turbines, and/or shaft or spools. Additionally, the turbofan engine 10 may not include each of the features described herein, or alternatively, may include one or more features not described herein. For example, in other examples, the fan 38 may not be a variable pitch fan. Additionally, although described as a "turbofan" gas turbine engine, in other examples the gas turbine engine may instead be configured as any other ducted gas turbine engine. In some examples, the turbofan engine 10 may be a two-stream engine or three-stream engine. In some examples, the turbofan engine 10 may or may not include the inlet guide vane 100.

As will be appreciated, operating the turbofan engine 10 may ordinarily lead to blade flutter and/or stall due to a flowpath of air. To mitigate the blade flutter and/or stall of the turbofan engine 10 due to the flowpath of air, smart-material-based-features are utilized on various portions of the turbofan engine 10.

Figure 2:
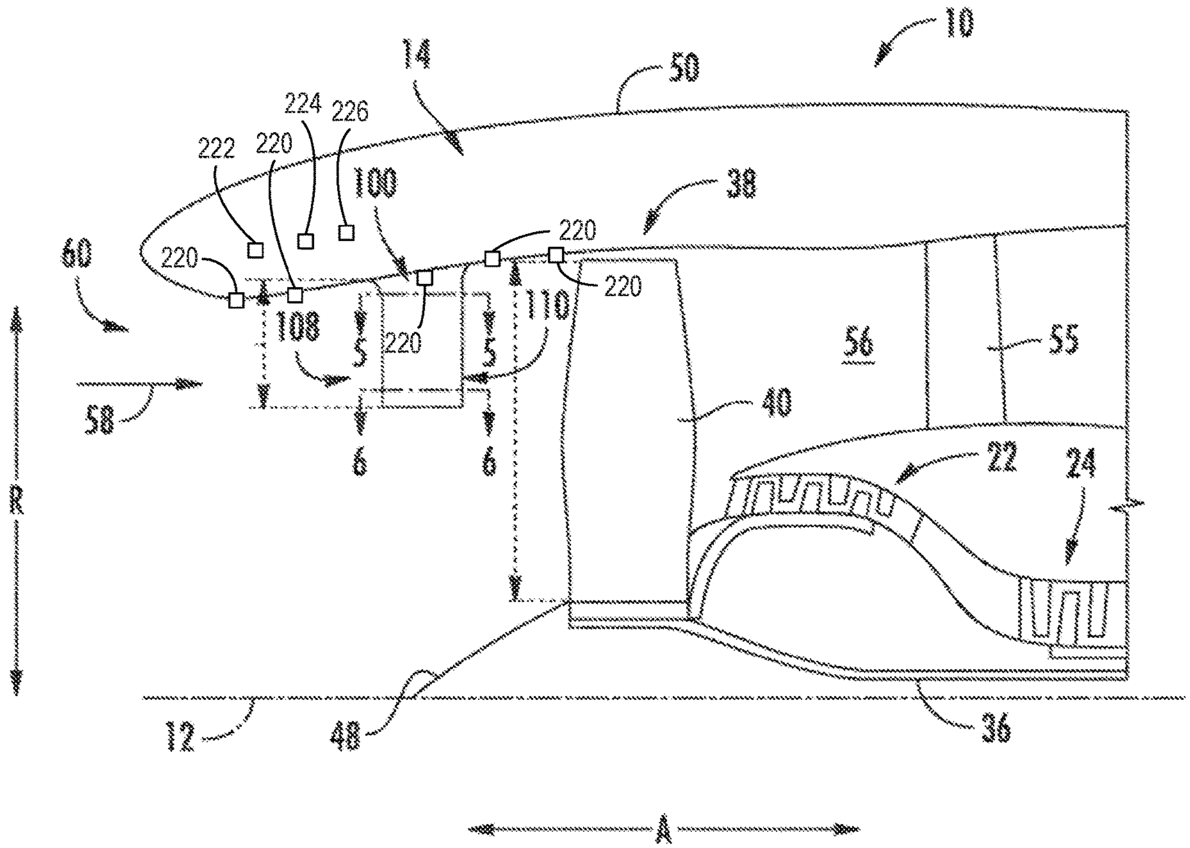
FIG. 2 is a close-up, schematic, cross-sectional view of a forward end of the example gas turbine engine of FIG. 1 including a plurality of smart-material-based features on a fan casing.

FIG. 2 is a close-up, schematic, cross-sectional view of a forward end of the example gas turbine engine of FIG. 1 including a plurality of smart-material-based features 220 on a fan casing 50. The turbofan engine 10 depicted generally includes smart-material-based features 220 that are placed on the fan casing 50. The smart-material-based features 220 may include at least one of a shape memory alloy, a bi-metal material, a graphene-based element, or a composite foam. The smart-material-based features 220 may include active vortex generators which are retractable. The smart-material-based features 220 may create at least one of a serration or a bump on at least one of the inner surface of the fan casing 50. The smart-material-based features may activate the active vortex generator when a smart material actuator 226 receives the signal to activate.

In certain examples, the turbofan engine 10 includes a sensor 222 (e.g., a pressure sensor, a vibration sensor, a speed sensor, etc.) which monitors an operating parameter of the turbofan engine 10 for a deviation from a reference value of an operating parameter. The operating parameter may include at least one of engine pressure, engine vibration, or engine speed. The turbofan engine 10 includes a controller 224 and the smart material actuator 226, the controller 224 sending a signal to the smart material actuator 226 to activate the smart-material-based features 220 when the sensor 222 outputs an indication of the deviation from the reference value of the operating parameter of the engine that has been detected by the sensor 222. The indication is a signal reflecting a detected deviation from the reference value of the operating parameter of the engine. The sensor 222 sends a signal to the controller 224 when the sensor 222 outputs the indication of the deviation from the reference value of the operating parameter of the engine. Once the smart-material-based feature is activated, the blade flutter and/or stall of the turbofan engine 10 due to the flowpath of air will mitigate or stop.

Figure 3:
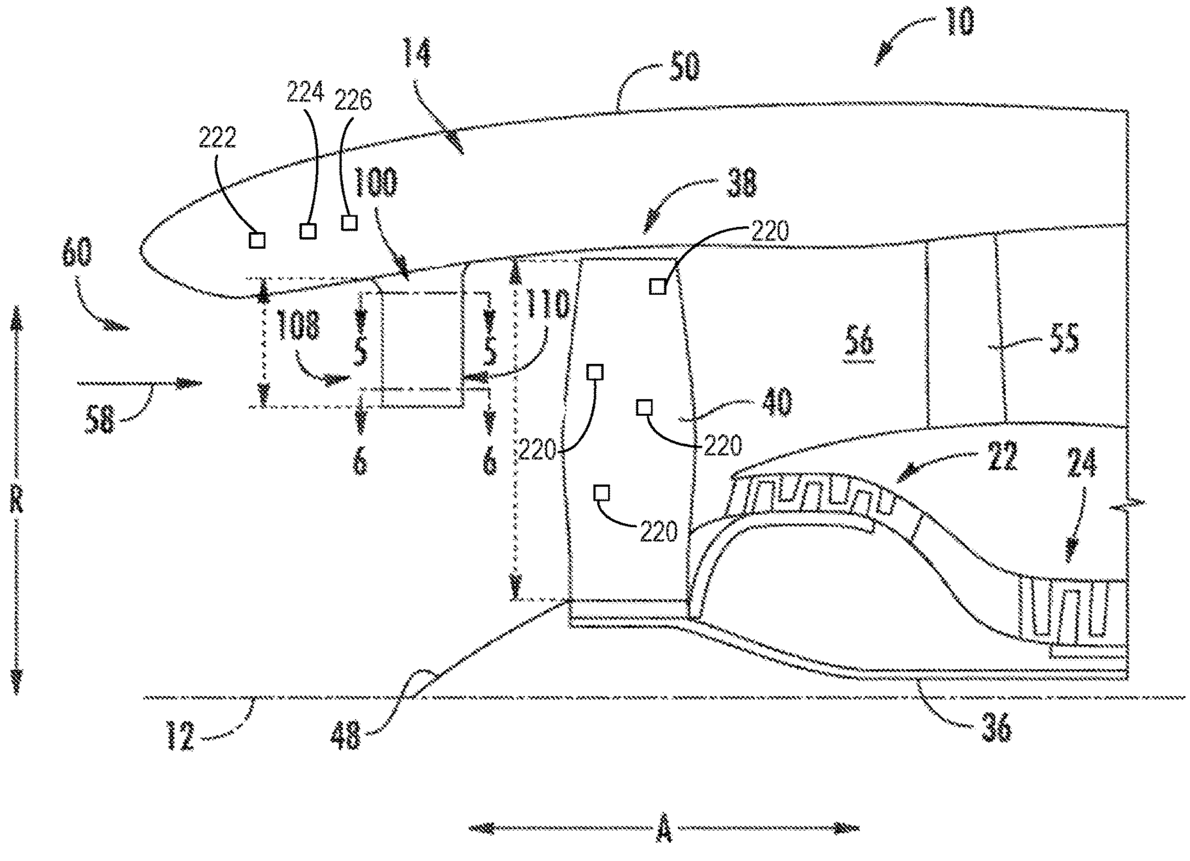
FIG. 3 is a close-up, schematic, cross-sectional view of a forward end of the example gas turbine engine of FIG. 1 including a plurality of smart-material-based features on a fan blade.

FIG. 3 is a close-up, schematic, cross-sectional view of a forward end of the example gas turbine engine of FIG. 1 including a plurality of smart-material-based features 220 positioned on the fan blades 40. As shown in the example of FIG. 3, the smart-material-based features 220 are arranged in a spaced-apart configuration (e.g., between 0.1 and 2.0 inches) on the exterior surface of the fan blades 40. In some examples, activation of the smart-material-based features 220 can occur at a local area to counter detrimental changes (e.g., bend, dent, flutter) in a particular area. The smart-material-based features 220 include at least one of a shape memory alloy, a bi-metal material, a graphene-based element, or a composite foam. The smart material actuator 226 activates the smart-material-based features 220 using at least one of electricity, electromagnetic waves, microwaves, or a graphene-based beating element.

Figure 4:
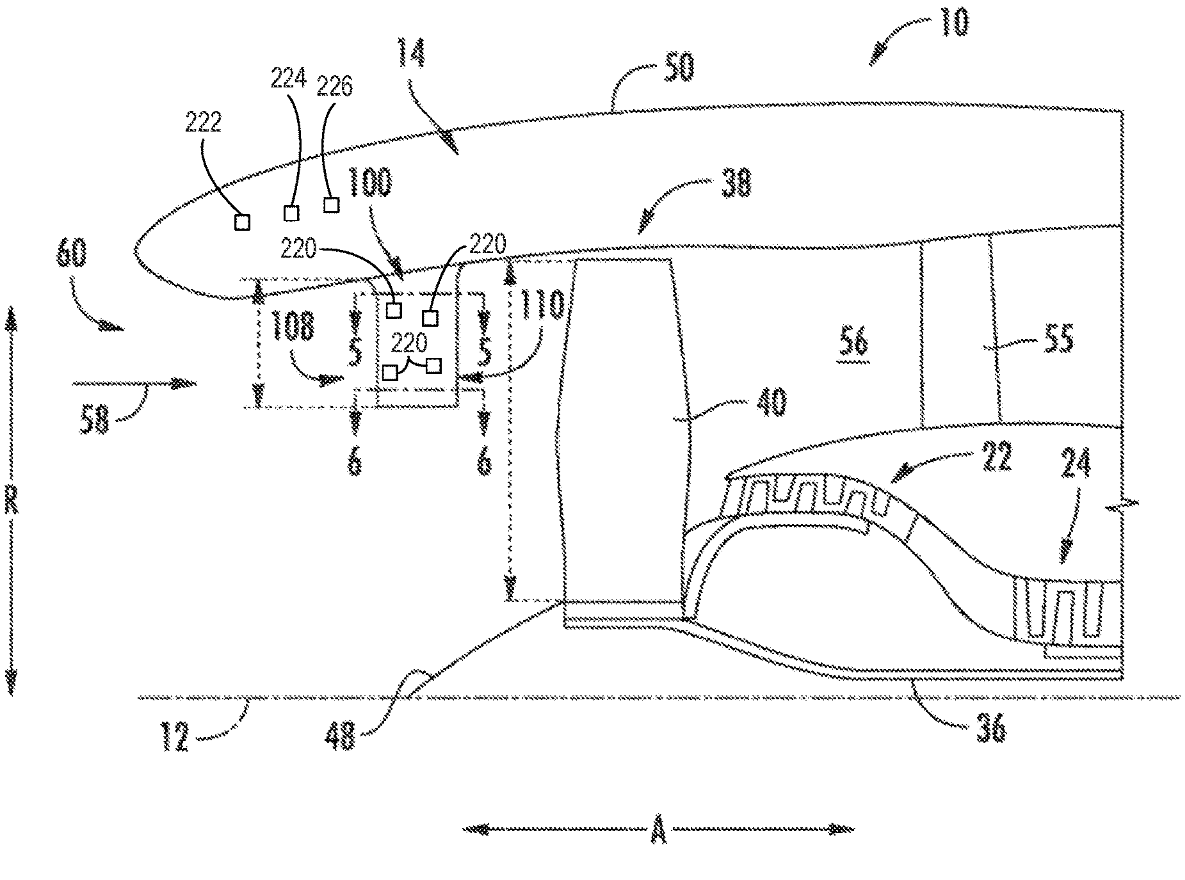
FIG. 4 is a close-up, schematic, cross-sectional view of a forward end of the example gas turbine engine of FIG. 1 including a plurality of smart-material-based features on an inlet guide vane.

FIG. 4 is a close-up, schematic, cross-sectional view of a forward end of the example gas turbine engine of FIG. 1 including a plurality of smart-material-based features 220 positioned on the inlet guide vane 100. As shown in the example of FIG. 4, the smart-material-based features 220 are arranged in a spaced-apart configuration (e.g., between 0.1 and 2.0 inches) on the inlet guide vane 100. The space-apart configuration of the smart-material-based features 220 on the inlet guide vane 100 helps move the air flow through the engine and correlates with a certain amount of air flow that moves through the engine.

Figure 5A:
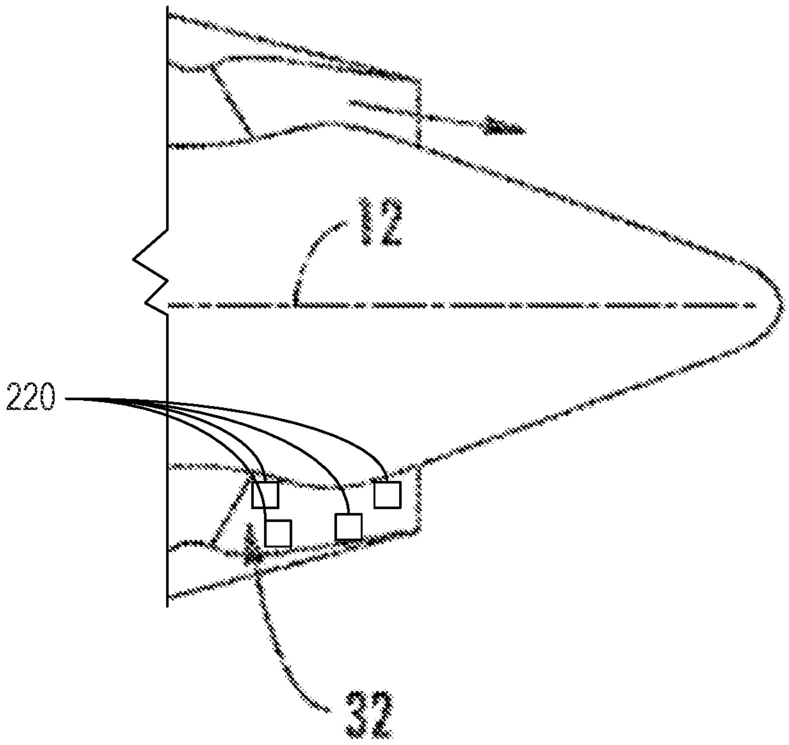
FIG. 5A is a close-up, schematic, cross-sectional view of a rear end of the example gas turbine engine of FIG. 1 including a plurality of smart-material-based features on a nozzle.

FIG. 5A is a close-up, schematic, cross-sectional view of a rear end of the example gas turbine engine of FIG. 1 including a plurality of the smart-material-based features 220 on the nozzle 32. As shown in FIG. 1, the turbofan engine 10 defines the longitudinal axis 12 and the nozzle 32. The turbofan engine 10 depicted in FIG. 5A includes smart-material-based features 220 that are placed on the nozzle 32. The smart-material-based features 220 on the nozzle 32 activate and help with the air flowing through the turbofan engine 10. As air flows through the rear end of the turbofan engine 10, the smart-material-based features 220 on the nozzle 32 mitigate blade flutter and inlet distortion caused by incoming air flow by changing the air flow.

Figure 5B:
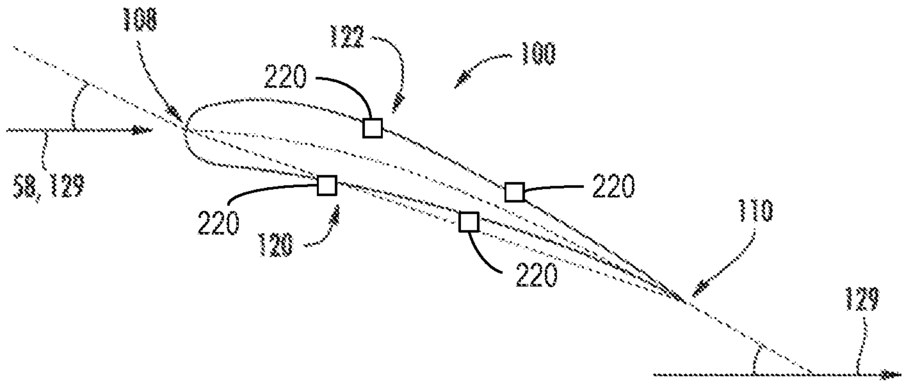
FIG. 5B is a cross-sectional view of the inlet guide vane of FIG. 4 including a plurality of smart-material-based features.

FIG. 5B is a cross-sectional view of the inlet guide vane 100 of FIG. 4 including a plurality of the smart-material-based features 220. As is depicted in FIG. 5B, the inlet guide vane 100 is configured generally as an airfoil having a pressure side 120 and an opposite suction side 122, extending between the leading edge 108 and the trailing edge 110. Air 58 flows in an airflow direction 129 through the inlet 60 of the fan casing 50. The cross-sectional view of the inlet guide vane 100 of the example gas turbine engine of FIG. 1 generally includes smart-material-based features 220 that are placed on the inlet guide vane 100.

Figure 6:
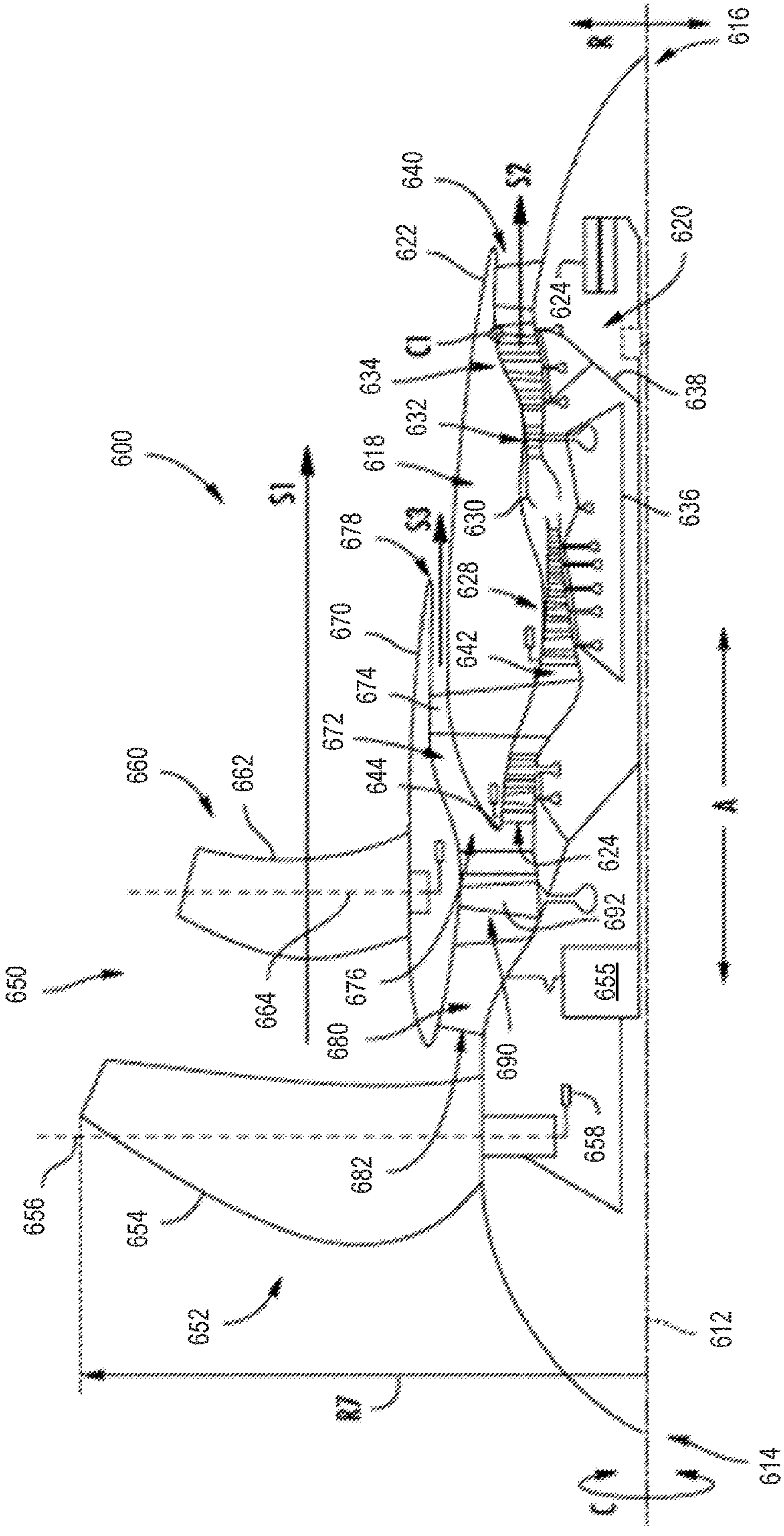
FIG. 6 is a schematic cross-sectional view of an example unducted gas turbine engine in which examples disclosed herein may be implemented.

FIGS. 1-5B illustrate example closed-rotor or ducted engine configurations able to benefit from placement of the smart-material-based features 220. FIGS. 6-8 illustrate example open-rotor or unducted engine configurations that can also benefit from placement of the smart-material-based features 220.

There are multiple engine configurations, such as an unducted gas turbine engine, where smart-material-based features can be placed. FIG. 6 is a schematic cross-sectional view of an unducted gas turbine engine 600 in which examples disclosed herein may be implemented. The unducted gas turbine engine 600 defines an axial direction A, a radial direction R, and a circumferential direction C. Moreover, the unducted gas turbine engine 600 defines an axial centerline or longitudinal axis 612 that extends along the axial direction A. The unducted gas turbine engine 600 extends between a forward end 614 and an aft end 616, e.g., along the axial direction A.

The unducted gas turbine engine 600 includes a core engine 618 and a fan section 650 positioned upstream thereof. Generally, the core engine 618 includes, in serial flow order, a compressor section, a combustion section, a turbine section, and an exhaust section. Particularly, as shown in FIG. 6, the core engine 618 includes an engine core 620 and a core cowl 622 that annularly surrounds the engine core 620. The engine core 620 and core cowl 622 define a core inlet 624. Pressurized air stream flows downstream to a combustor 630 where fuel is injected into the pressurized air stream and ignited to raise the temperature and energy level of the pressurized air.

The high energy combustion products flow from the combustor 630 downstream to a high pressure turbine 632. The high pressure turbine 632 drives the high pressure compressor 628 through a first shaft or high pressure (HP) shaft 636. The high energy combustion products then flow to a low pressure turbine 634. A low pressure (LP) shaft 638 is coaxial with the HP shaft 636 in this example. After driving each the high pressure turbine 632 and the low pressure turbine 634, the combustion products exit the core engine 618 through a nozzle 640 to produce propulsive thrust. The nozzle 640 can be a third-stream nozzle or a core exhaust nozzle depending on the engine configuration. Accordingly, the core engine 618 defines a core flowpath or core duct 642 that extends between the core inlet 624 and the nozzle 640.

The fan section 650 includes a primary fan 652. For the example of FIG. 6, the primary fan 652 is an open rotor or unducted primary fan 652. However, in other examples, the primary fan 652 may be ducted, e.g., by a fan casing 50 (FIG. 1) or nacelle circumferentially surrounding the primary fan 652. As depicted, the primary fan 652 includes an array of fan blades 654 (only one shown in FIG. 6). The fan blades 654 are rotatable, e.g., about the longitudinal axis 612. As noted above, the primary fan 652 is drivingly coupled with the low pressure turbine 634 via the LP shaft 638. The primary fan 652 can be directly coupled with the LP shaft 638, e.g., in a direct-drive configuration. Optionally, as shown in FIG. 6, the primary fan 652 can be coupled with the LP shaft 638 via a speed reduction gearbox 655, e.g., in an indirect-drive or geared-drive configuration.

Moreover, the fan blades 654 can be arranged in equal spacing around the longitudinal axis 612. Each of the fan blades 654 has a root and a tip and a span defined therebetween. Each of the fan blades 654 defines a central blade axis 656. For this example, each of the fan blades 654 of the primary fan 652 is rotatable about their respective central blade axes 656, e.g., in unison with one another. One or more actuators 658 can be controlled to pitch the fan blades 654 about their respective central blade axes 656. However, in other examples, each of the fan blades 654 may be fixed or unable to be pitched about its central blade axis 656.

The fan section 650 further includes an exit guide vane 660 that includes fan guide vanes 662 (only one shown in FIG. 6) disposed around the longitudinal axis 612. Each of the fan guide vanes 662 defines a central blade axis 664. The fan guide vanes 662 are mounted to a fan cowl 670.

The fan cowl 670 annularly encases at least a portion of the core cowl 622 and is generally positioned outward of the core cowl 622 along the radial direction R. Particularly, a downstream section of the fan cowl 670 extends over a forward portion of the core cowl 622 to define a fan flowpath or fan duct 672. Incoming air may enter through the fan duct 672 through a fan duct inlet 676 and may exit through a fan exhaust nozzle 678 to produce propulsive thrust. The fan duct 672 is an annular duct positioned generally outward of the core duct 642 along the radial direction R. The fan cowl 670 and the core cowl 622 are connected together and supported by a plurality of substantially radially-extending, circumferentially-spaced struts 674 (only one shown in FIG. 6). The struts 674 may each be aerodynamically contoured to direct air flowing thereby.

The unducted gas turbine engine 600 also defines or includes an inlet duct 680. The inlet duct 680 extends between an engine inlet 682 and the core inlet 624/fan duct inlet 676. Air flowing downstream along the inlet duct 680 is split, not necessarily evenly, into the core duct 642 and the fan duct 672 by a nose of a splitter 644 of the core cowl 622. In various examples, it will be appreciated that the unducted gas turbine engine 600 includes a ratio of a quantity of the fan guide vanes 662 to a quantity of fan blades 654 that could be less than, equal to, or greater than 1:1.

With reference to FIG. 6, operation of the unducted gas turbine engine 600 may be summarized in the following manner. During operation, an initial or incoming airflow passes through the fan blades 654 of the primary fan 652 and splits into a first airflow and a second airflow. The first airflow bypasses the engine inlet 682 and flows generally along the axial direction A outward of the fan cowl 670 along the radial direction R. The first airflow accelerated by the fan blades 654 passes through the fan guide vanes 662 and continues downstream thereafter to produce a primary propulsion stream or first thrust stream S1. The second airflow flowing downstream through the inlet duct 680 flows through low pressure compressor blades 692 of a first stage of a low pressure compressor 690 and is consequently compressed. The second airflow flowing downstream of the first stage of the low pressure compressor 690 is split by the splitter 644 located at the forward end of the core cowl 622. The air flows generally along the axial direction A through the fan duct 672 and is ultimately exhausted from the fan duct 672 through the fan exhaust nozzle 678 to produce a third thrust stream S3. A "third stream" or third thrust stream S3 as used herein means a secondary air stream capable of increasing fluid energy to produce a minority of total propulsion system thrust.

Although the unducted gas turbine engine 600 has been described and illustrated in FIG. 6 as representing an example three-stream gas turbine engine operable to produce first thrust stream S1, second thrust stream S2, and third thrust stream S3, it will be appreciated that the aspects of the present disclosure may apply to three-stream gas turbine engines having other configurations such as having one stream or two streams. One stream engines produce the first thrust stream S1. Two stream engines produce the first thrust stream S1 and the second thrust stream S2. Three stream engines produce the first thrust stream S1, the second thrust stream S2, and the third thrust stream S3.

Figure 7A:
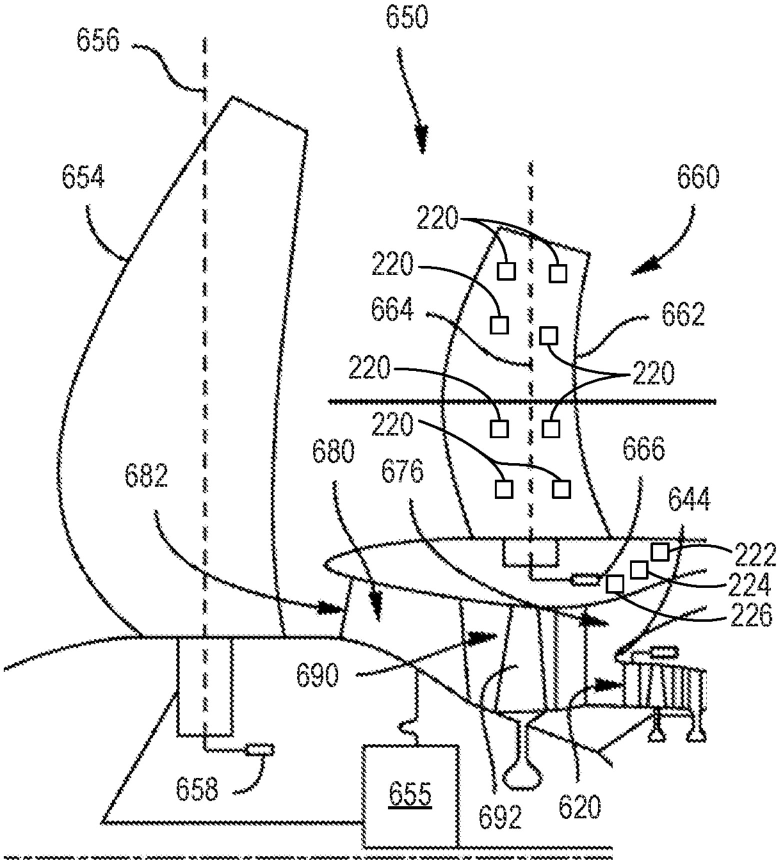
FIG. 7A is a close-up, schematic, cross-sectional view of a forward end of the example unducted gas turbine engine of FIG. 6 including a plurality of smart-material-based features on an exit guide vane.
Figure 7B:
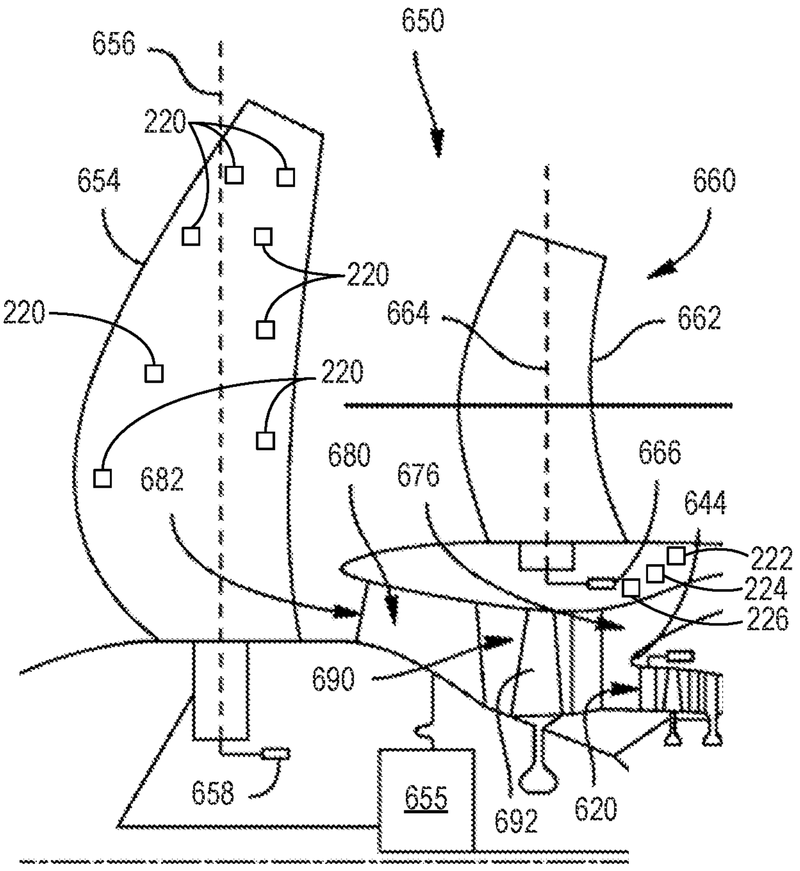
FIG. 7B is a close-up, schematic, cross-sectional view of a forward end of the example unducted gas turbine engine of FIG. 6 including a plurality of smart-material-based features on a fan blade.
Figure 8:
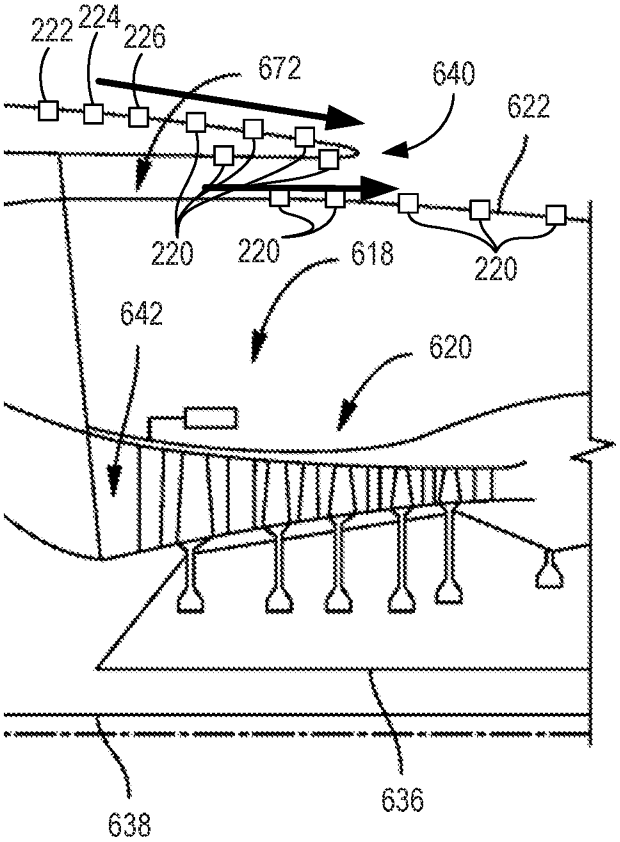
FIG. 8 is a close-up, schematic, cross-sectional view of a rear end of the example unducted gas turbine engine of FIG. 6 including a plurality of smart-material-based features on a third-stream nozzle.

FIGS. 7A, 7B, and 8 are close-up, schematic, cross-sectional views of a forward end of the unducted gas turbine engine 600 of FIG. 6 including a plurality of the smart-material-based features 220 on the exit guide vane 660, on the array of fan blades 654, and on the nozzle 640, respectively. The smart-material-based features 220 on the exit guide vane 660, on the array of fan blades 654, and on the nozzle 640 are adapted to mitigate inlet distortion, blade flutter, and/or bend and/or tip clearance issues. The smart-material-based features 220 create, when activated by the smart material actuator 226, at least one of a serration or a bump on at least one of the exit guide vane 660, on the array of fan blades 654, and on the nozzle 640. In some examples, activation of smart-material-based features 220 can occur at a local area to counter detrimental changes (e.g., bend, dent, flutter) in a particular area.

The smart-material-based features 220 include at least one of a shape memory alloy, a bi-metal material, a graphene-based element, or a composite foam. The smart material actuator 226 activates the smart-material-based features 220 using at least one of electricity, electromagnetic waves, microwaves, or a graphene-based heating element. The unducted gas turbine engine 600 includes the sensor 222 which monitors an operating parameter of the unducted gas turbine engine 600 for a deviation from a reference value of an operating parameter. The operating parameter may include at least one of engine pressure, engine vibration, or engine speed, for example. The unducted gas turbine engine 600 includes the controller 224 and the smart material actuator 226, the controller 224 sending a signal to the smart material actuator 226 to activate the smart-material-based feature(s) 220 when the sensor 222 outputs an indication of the deviation from the reference value of the operating parameter of the engine. The sensor 222 sends a signal to the controller 224 when the sensor 222 outputs the indication of the deviation from the reference value of the operating parameter of the engine. In operation, as airflows through the engine and the sensor 222 senses a deviation from the operating reference values, the smart-material-based features 220 are activated to counter detrimental changes (e.g., bend, dent, flutter).

Figure 9A:
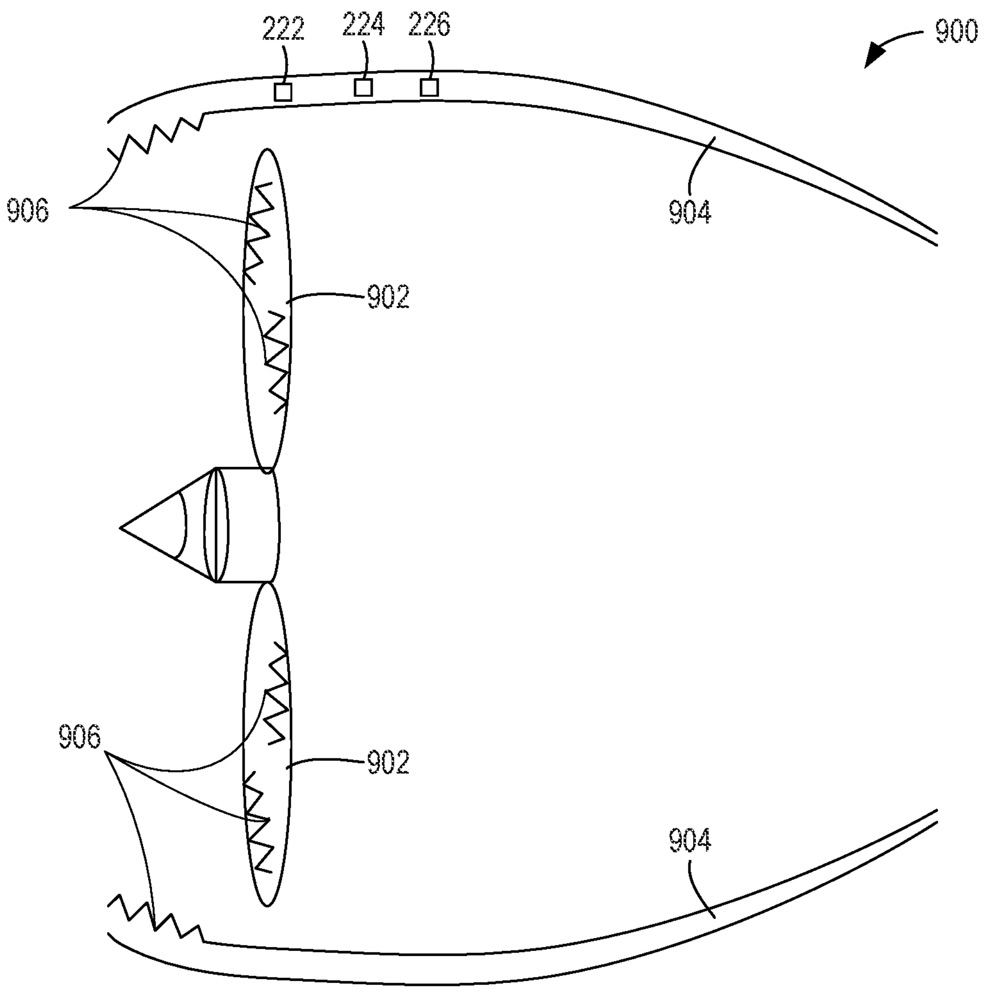
FIG. 9A is a close-up, schematic, cross-sectional view of a forward end of the example gas turbine engine of FIG. 1 including a plurality of smart-material-based features implemented as serrations on a fan casing and fan blade.

FIG. 9A is a close-up, schematic, cross-sectional view of a forward end of the example gas turbine engine of FIG. 1 including a plurality of the smart-material-based features 220 implemented as serrations on a fan casing 904 and fan blade 902. A turbofan engine 900 has smart-material-based features 906 on fan casing 904 and/or fan blade 902 are adapted to mitigate inlet distortion, blade flutter or bend or tip clearance issues. The smart-material-based features 906 create, when activated, at least one of a serration or a bump on at least one of the inner surface of the fan casing 904, an exterior surface of the fan blade 902, the inner surface of the nozzle, the outer surface of the nozzle, or the inlet guide vane when the smart material actuator 226 receives the signal to activate. In some examples, activation of smart-material-based features 906 can occur at a local area to counter detrimental changes (e.g., bend, dent, flutter) in a particular area. The smart-material-based features 906 includes at least one of a shape memory alloy, a bi-metal material, a graphene-based element, or a composite foam. The smart material actuator 226 activates the smart-material-based features 906 using at least one of electricity, electromagnetic waves, microwaves, or a graphene-based heating element.

The turbofan engine 900 includes the sensor 222 which monitors an operating parameter of the turbofan engine for a deviation from a reference value of an operating parameter. The operating parameter may include at least one of engine pressure, engine vibration, or engine speed. The turbofan engine 900 includes the controller 224 and the smart material actuator 226, the controller 224 sending a signal to the smart material actuator 226 to activate the smart-material-based feature when the sensor 222 outputs the indication of the deviation from the reference value of the operating parameter of the engine. The sensor 222 sends a signal to the controller 224 when the sensor 222 outputs the indication of the deviation from the reference value of the operating parameter of the engine.

Figure 9B:
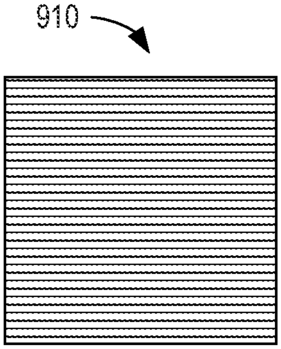
FIG. 9B is a close-up view of a first implementation of the example serrations of FIG. 9A.

FIG. 9B is a close-up view of a first implementation of the example serrations of FIG. 9A. A serration pattern 910 shows a straight-line pattern. In some examples, serrations can be a different pattern. Serrations are made of different shapes that protrude and create turbulence to the flow. In some examples, activation of smart materials to create the serration pattern 910 can occur at a local area to counter detrimental changes (e.g., bend, dent, flutter) in a particular area. In other examples, activation of smart materials to create the serration pattern 910 extends across an entire surface (e.g., an interior surface of a fan casing, an exterior surface of a fan blade, a surface of an inlet guide vane, etc.).

Figure 9C:
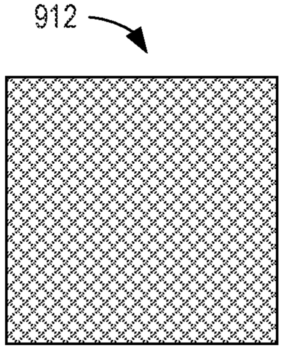
FIG. 9C is a close-up view of a second implementation of the example serrations of FIG. 9A.

FIG. 9C is a close-up view of a second implementation of the example serrations of FIG. 9A. A serration pattern 912 shows a criss-cross pattern. In some examples, serrations can be a different pattern. Serrations are made of different shapes that protrude and create turbulence to the flow. In some examples, activation of smart materials to create the serration pattern 912 can occur at a local area to counter detrimental changes (e.g., bend, dent, flutter) in a particular area. In other examples, activation of smart materials to create the serration pattern 912 extends across an entire surface (e.g., an interior surface of a fan casing, an exterior surface of a fan blade, a surface of an inlet guide vane, etc.).

Figure 9D:
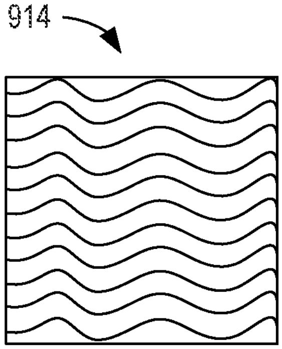
FIG. 9D is a close-up view of a third implementation of the example serrations of FIG. 9A.

FIG. 9D is a close-up view of a third implementation of the example serrations of FIG. 9A. A serration pattern 914 shows a wavy pattern. In some examples, serrations can be a different pattern. Serrations are made of different shapes that protrude and create turbulence to the flow. In some examples, activation of smart materials to create the serration pattern 914 can occur at a local area to counter detrimental changes (e.g., bend, dent, flutter) in a particular area. In other examples, activation of smart materials to create the serration pattern 914 extends across an entire surface (e.g., an interior surface of a fan casing, an exterior surface of a fan blade, a surface of an inlet guide vane, etc.).

Figure 10:
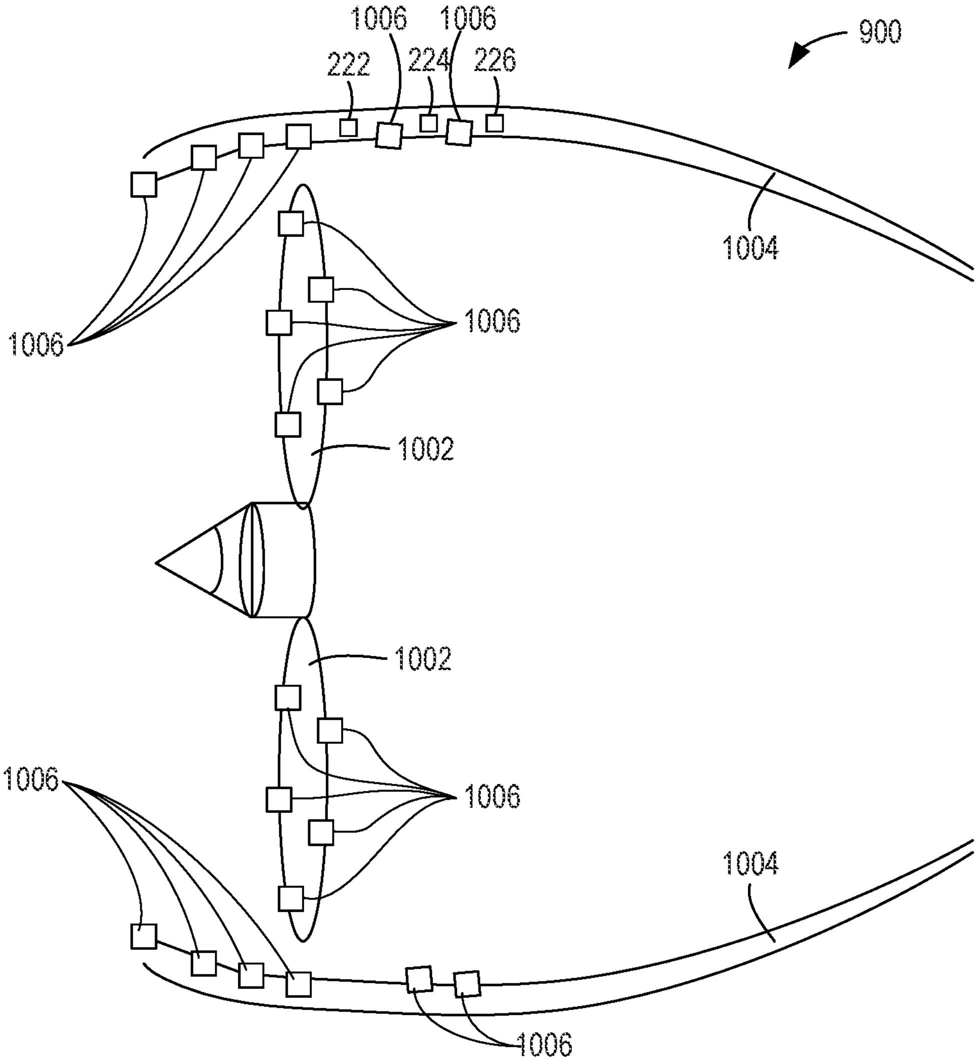
FIG. 10 is a close-up, schematic, cross-sectional view of a forward end of the example gas turbine engine of FIG. 1 including a plurality of active vortex generators on a fan casing and fan blade.

FIG. 10 is a close-up, schematic, cross-sectional view of a forward end of the example gas turbine engine of FIG. 1 including a plurality of active vortex generators 1006 on a fan casing 1004 and fan blade 1002. A turbofan engine 900 has active vortex generators 1006 on fan casing 1004 and/or fan blade 1002 are adapted to mitigate inlet distortion, blade flutter or bend or tip clearance issues. The active vortex generators 1006 is a smart-material-based feature. The active vortex generators 1006 are retractable. The smart material actuator 226 activates a smart-material-based feature using at least one of electricity, electromagnetic waves, microwaves, or a graphene-based beating element. The smart-material-based feature includes at least one of a shape memory alloy, a bi-metal material, a graphene-based element, or a composite foam. The turbofan engine 900 includes the sensor 222 which monitors an operating parameter of the turbofan engine for a deviation from a reference value of an operating parameter. The operating parameter may include at least one of engine pressure, engine vibration, or engine speed. The turbofan engine 900 includes the controller 224 and the smart material actuator 226, the controller 224 sending a signal to the smart material actuator 226 to activate the smart-material-based feature when the sensor 222 outputs the indication of the deviation from the reference value of the operating parameter of the engine. The sensor 222 sends a signal to the controller 224 when the sensor 222 outputs the indication of the deviation from the reference value of the operating parameter of the engine.

Figure 11:
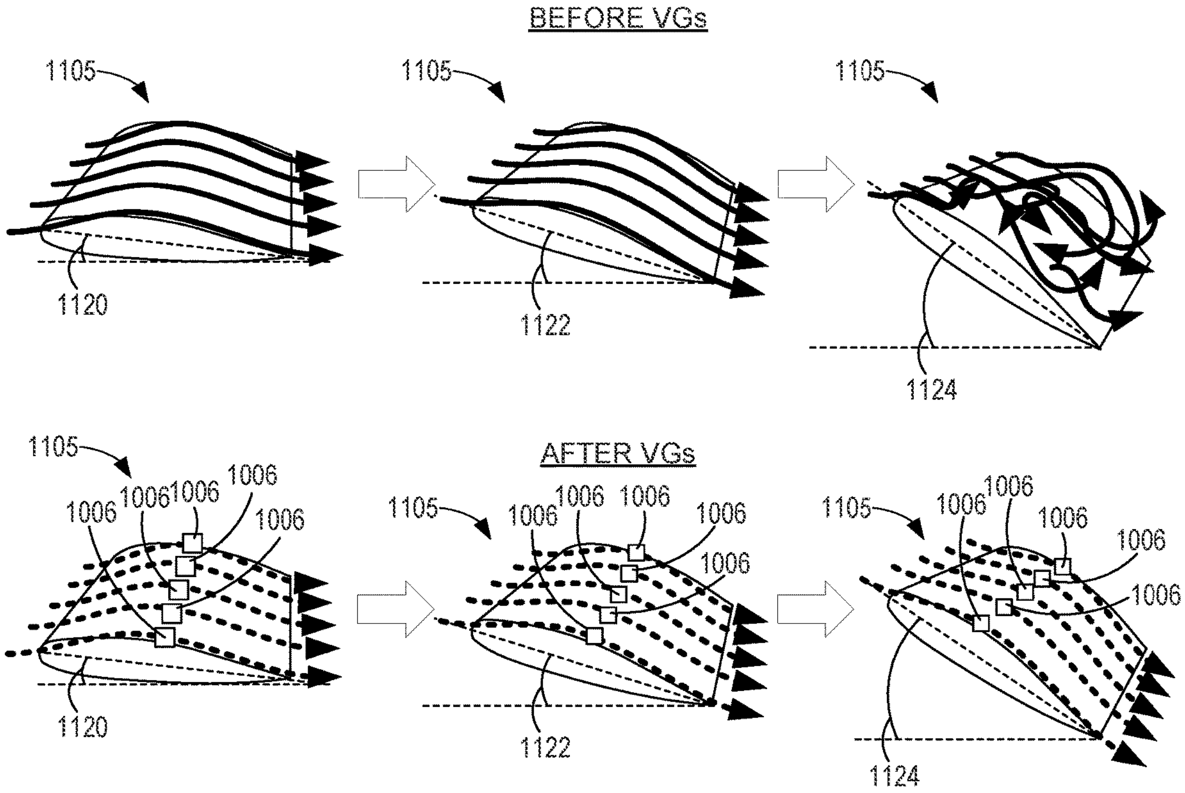
FIG. 11 is an illustration of an implementation of the example plurality of the active vortex generators of FIG. 10 on a wing.

FIG. 11 is an illustration of an implementation of the example plurality of the active vortex generators 1006 of FIG. 10 on a wing 1105. Before active vortex generators 1006 are activated, there is smooth airflow on a surface such as the wing 1105 of a commercial airplane. As smooth airflow continues, the boundary layer begins to separate. Subsequently, the wing 1105 stalls. On the other hand, after active vortex generators 1006 are activated, there is vortex airflow on the wing 1105. As vortex airflow continues, the boundary layer is energized by vortices. Subsequently, the boundary layer remains attached, and the wing 1105 does not stall. As shown, the wing 1105 has a certain angle of attack (AoA). A first AoA 1120 of the wing 1105 has the smallest angle and a second AoA 1122 of the wing 1105 has an angle larger than the first AoA 1120 but smaller than a third AoA 1124 of the wing 1105. The third AoA 1124 of the wing 1105 has the largest angle compared to the first AoA 1120 and the second AoA 1122. When the first AoA 1120 of the wing 1105 is small or the second AoA 1122 of the wing 1105 is relatively larger than the first AoA 1120, the airflow is attached to the wing 1105, regardless of the active vortex generators 1006 being utilized. However, when the AoA increases (above a threshold value) to the third AoA 1124 of the wing 1105, the airflow separates from the wing 1105 before the active vortex generators 1006 are utilized, resulting in the wing 1105 stalling. After the active vortex generators 1006 are activated, airstream reattachment results when the wing 1105 operates under the third AoA 1124. Consequently, the AoA, causing the wing 1105 to stall, is increased for configuration with the active vortex generators 1006 being activated when the wing 1105 operates under a large AoA and the surface is smooth, causing low drag forces, when the wing 1105 operates under a small AoA.

Figure 12A:
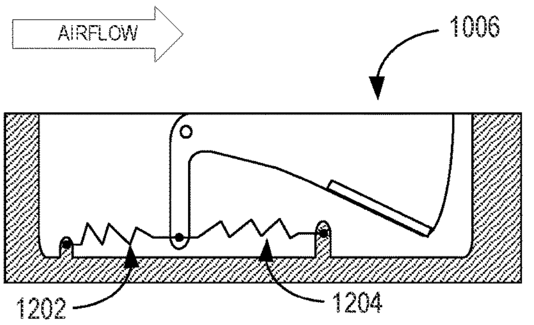
FIG. 12A is an illustration of a deactivated position of the example active vortex generator of FIG. 10 using a spring.

FIG. 12A is an illustration of a deactivated position of the example active vortex generator 1006 of FIG. 10 using a spring 1202. In the deactivated position of the example active vortex generator 1006, a spring 1202 is attached to a shape memory alloy (SMA) actuator 1204. The SMA actuator 1204 is an example of the smart material actuator 226, as described above. The spring 1202 does not move and the SMA actuator 1204 does not actuate during a deactivated position of the example active vortex generator 1006.

Figure 12B:
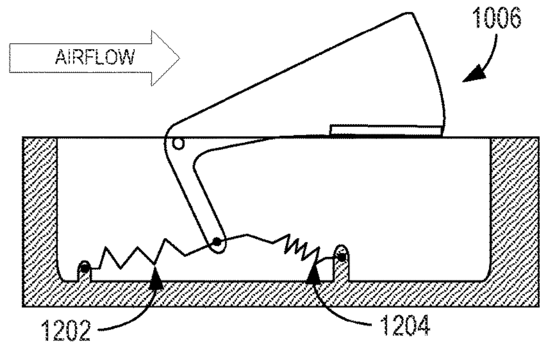
FIG. 12B is an illustration of an activated position of the example active vortex generator of FIG. 10 using the spring.

FIG. 12B is an illustration of an activated position of the example active vortex generator 1006 of FIG. 10 using a spring 1202. In the activated position of the example active vortex generator 1006, the spring 1202 is attached to the SMA actuator 1204. The spring 1202 moves when the SMA actuator 1204 activates during an activated position of the example active vortex generator 1006.

Figure 13A:
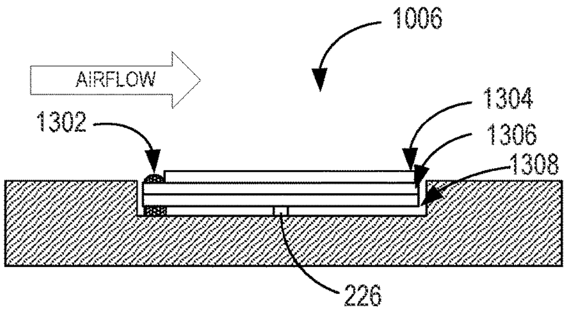
FIG. 13A is an illustration of a deactivated position of the example active vortex generator of FIG. 10 using a smart material actuator.
Figure 13B:
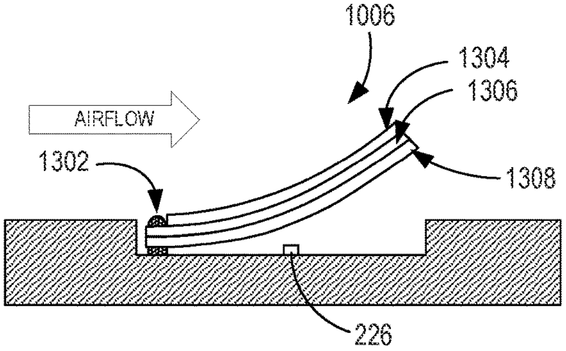
FIG. 13B is an illustration of an activated position of the example active vortex generator of FIG. 10 using the smart material actuator.

FIGS. 13A and 13B illustrate a deactivated position and an activated position, respectively, of the example active vortex generator 1006 of FIG. 10. FIG. 13A is an illustration of a deactivated position of the example active vortex generator 1006 of FIG. 10 using the smart material actuator 226. FIG. 13A shows an electric terminal 1302, a sealing layer 1304, a SMA layer 1306, and a base plate 1308. In some examples, the SMA layer 1306 may be wires or metal other than the base plate 1308. In a deactivated position, the air flow does not cause the smart material actuator 226 shaped to the active vortex generator 1006 to activate. In some examples, the smart material actuator 226 may be bimetallic-based or SMA-based. FIG. 13B is an illustration of an activated position of the example active vortex generator 1006 of FIG. 10 using the smart material actuator 226. FIG. 13B shows the electric terminal 1302, the sealing layer 1304, the SMA layer 1306, and the base plate 1308. In an activated position, the air flow causes the smart material actuator 226 shaped to the active vortex generator 1006 to activate by bending.

Figure 13C:
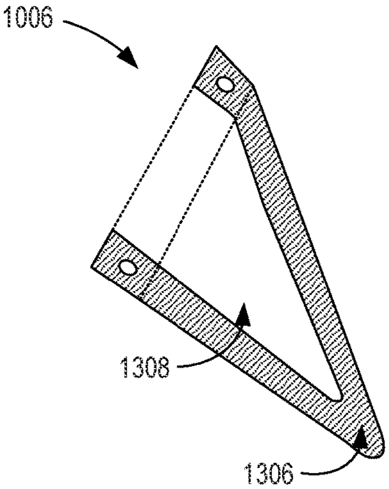
FIG. 13C is a close-up, schematic, cross-sectional view of the example active vortex generator of FIG. 13A.
Figure 13D:
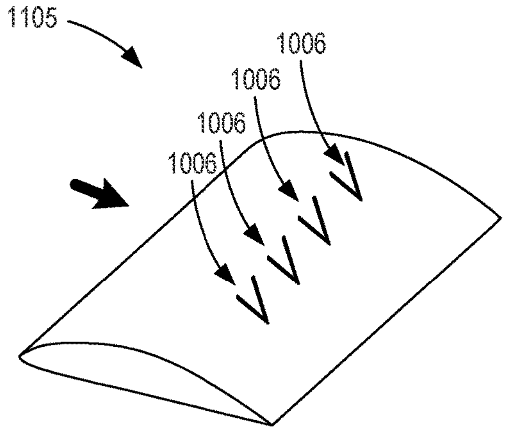
FIG. 13D is an example arrangement of the example plurality of the active vortex generators of FIG. 13A on the wing of FIG. 11.

FIG. 13C is a close-up, schematic, cross-sectional view of the example active vortex generator 1006 of FIG. 13A. FIG. 13C shows the SMA layer 1306 and the base plate 1308. When air flows across the base plate 1308, the air impacts the activated SMA layer 1306, which distorts or otherwise adjusts the air flow to mitigate blade futter and/or wing stall. FIG. 13D is an example arrangement of the example plurality of the active vortex generators 1006 of FIG. 13A on the wing 1105 of FIG. 11. Air flows through the plurality of the active vortex generators 1006 on the wing 1105 to mitigate blade flutter and/or stall, as shown in FIG. 13D.

Figure 14:
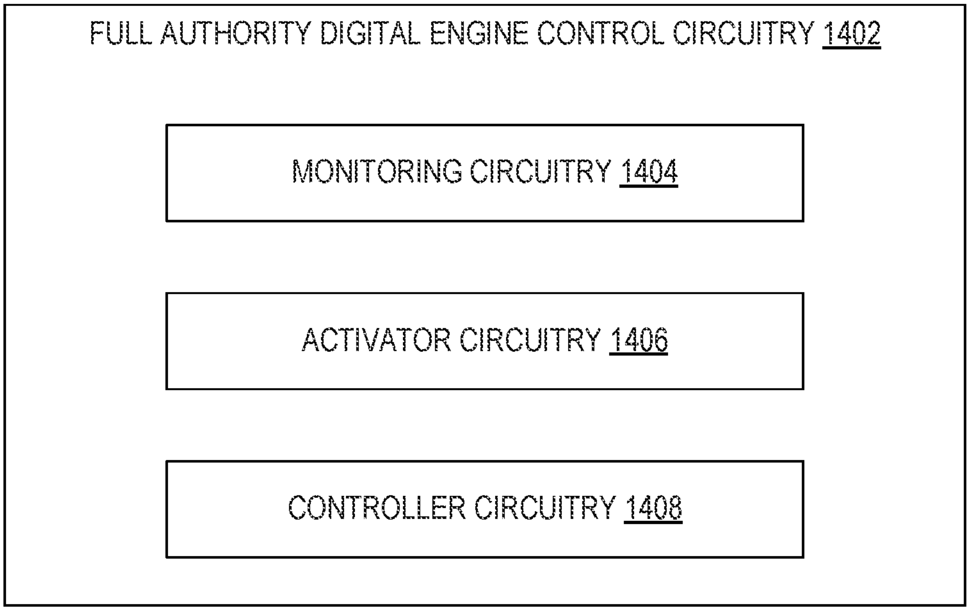
FIG. 14 is a block diagram of an example full authority digital engine control circuitry.

FIG. 14 illustrates a block diagram of an example full authority digital engine control (FADEC) circuitry 1402. In the illustrated example of FIG. 14, the example full authority digital engine control circuitry 1402 includes example monitoring circuitry 1404, example activator circuitry 1406, and example controller circuitry 1408.

In operation, and as described in further detail below, the example monitoring circuitry 1404 monitors the operating parameters, the example activator circuitry 1406 activates the smart-material-based features 220, and the example controller circuitry 1408 controls the smart-material-based features 220.

In FIG. 14, the example monitoring circuitry 1404 monitors operating parameters. Operating parameters may include, but are not limited to, at least one of engine pressure, engine vibration, or engine speed. The example monitoring circuitry 1404 monitors the operating parameters by checking against reference values of the operating parameters. If there is a deviation from the reference values of the operating parameters, it may represent an engine not operating to its standard performance. In some examples, engine speed is typically measured as a percent (0-100%) of redline speed for each spool of the engine. In some examples, typical pressures are atmospheric pressure (P0) at about 2-16 PSIA and compressor discharge pressure (P3) at about 15 PSIA with engine off up to about 1000 PSIA in operation at takeoff conditions. In some examples, vibrations typically refer to 1/revolution of a given spool or the blade passing frequencies of a given rotor.

When there is a deviation from the reference values of the operating parameters, the example activator circuitry 1406 activates the smart-material-based features 220. As described above, smart-material-based features 220 may include, but are not limited to, active vortex generators. The smart-material-based features 220 mitigate effects from an engine with deviations from its reference values of the operating parameters. The smart-material-based features 220 includes at least one of a shape memory alloy, a bi-metal material, a graphene-based element, or a composite foam. The example activator circuitry 1406 sends a signal to the smart material actuator 226 to activate the smart-material-based features 220 using at least one of electricity, electromagnetic waves, microwaves, or a graphene-based heating element. In some examples, activation of smart-material-based features 220 can occur at a local area (rather than the entire surface of the relevant part) to counter detrimental changes (e.g., bend, dent, flutter) in a particular area.

In some examples, after the example activator circuitry 1406 activates the smart-material-based features 220, the example controller circuitry 1408 may determine whether to adjust the smart-material-based features 220. For example, if the smart-material-based feature is to be adjusted, the example controller circuitry 1408 determines an adjustment percentage and adjusts the smart-material-based features 220 based on that percentage. For example, if the smart-material-based features 220 need to be adjusted slightly, such as by 3%, to mitigate the blade flutter of the engine, the example controller circuitry 1408 adjusts the smart-material-based features 220 by that percentage.

After the example activator circuitry 1406 activates the smart-material-based features 220, the example controller circuitry 1408 checks if the engine is still operating. If the engine is still in operation, the example controller circuitry 1408 sends a signal to the example monitoring circuitry 1404 to continue monitoring the operating parameters for a deviation from the reference values. If the engine is no longer operating, the example controller circuitry 1408 deactivates the smart-material-based features 220.

FIG. 14 is a block diagram of an example implementation of the example full authority digital engine control circuitry 1402 to improve fan operability control using smart materials. The example full authority digital engine control circuitry 1402 of FIG. 14 may be instantiated (e.g., creating an instance of, bring into being for any length of time, materialize, implement, etc.) by programmable circuitry such as a Central Processor Unit (CPU) executing first instructions. Additionally or alternatively, the example full authority digital engine control circuitry 1402 of FIG. 14 may be instantiated (e.g., creating an instance of, bring into being for any length of time, materialize, implement, etc.) by (i) an Application Specific Integrated Circuit (ASIC) and/or (ii) a FPGA structured and/or configured in response to execution of second instructions to perform operations corresponding to the first instructions. It should be understood that some or all of the circuitry of FIG. 14 may, thus, be instantiated at the same or different times. Some or all of the circuitry of FIG. 14 may be instantiated, for example, in one or more threads executing concurrently on hardware and/or in series on hardware. Moreover, in some examples, some or all of the circuitry of FIG. 14 may be implemented by microprocessor circuitry executing instructions and/or FPGA circuitry performing operations to implement one or more virtual machines and/or containers.

Figure 15:
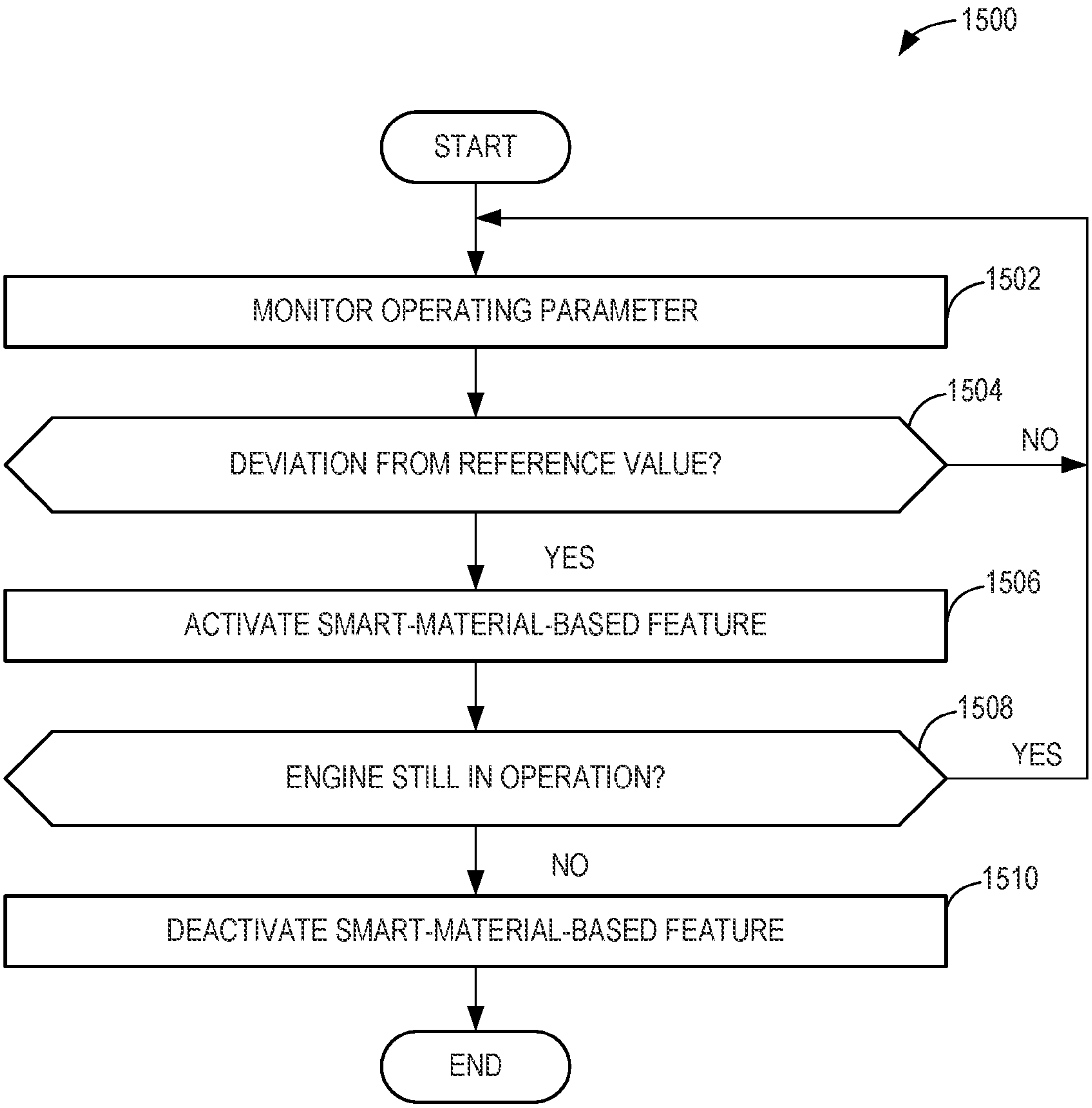
FIGS. 15 and 16 are flowcharts representative of example machine readable instructions and/or example operations that may be executed, instantiated, and/or performed by example programmable circuitry to implement the example full authority digital engine control circuitry of FIG. 14.
Figure 16:
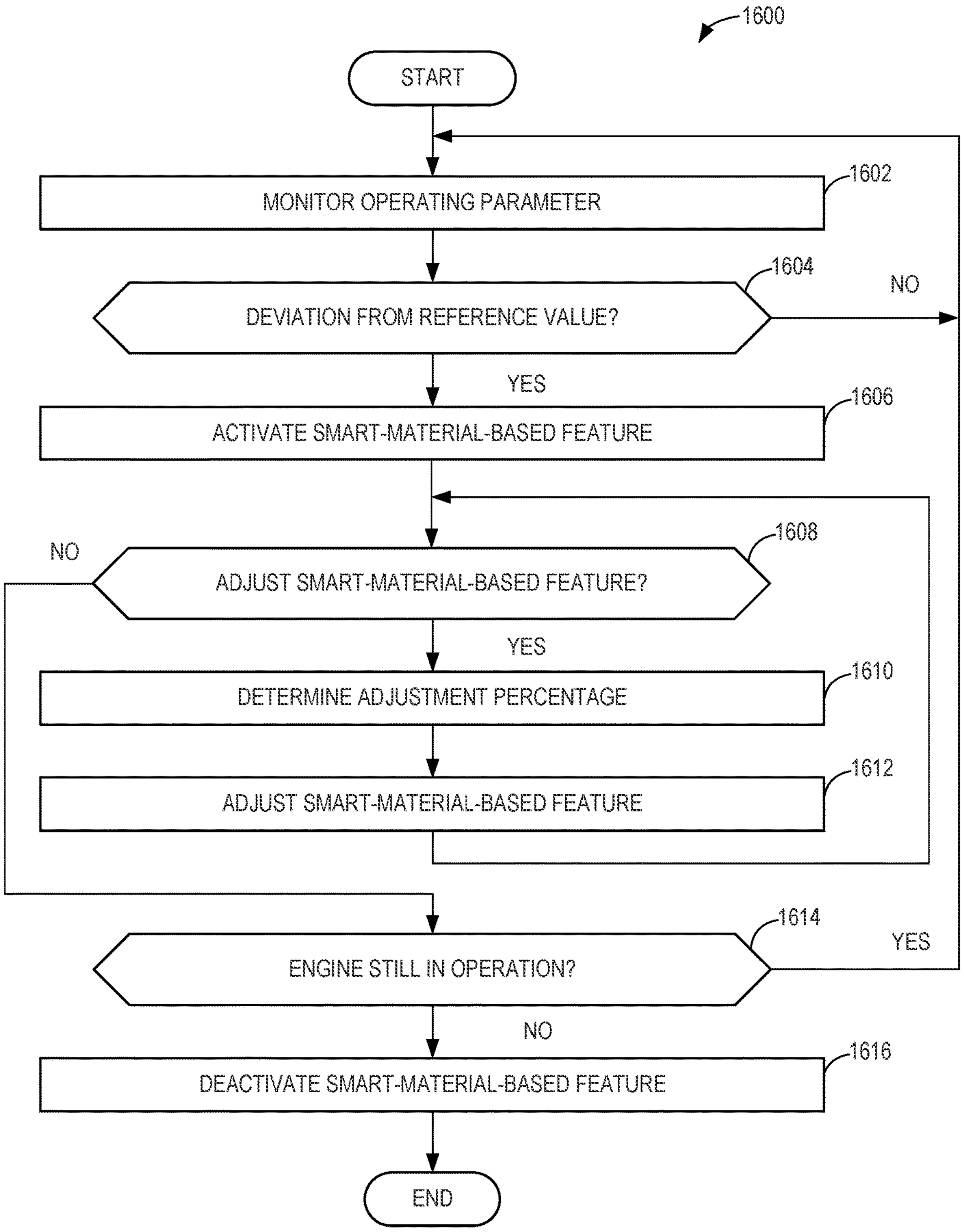

In some examples, the example monitoring circuitry 1404 is instantiated by programmable circuitry executing example monitoring circuitry 1404 instructions and/or configured to perform operations such as those represented by the flowcharts of FIGS. 15 and 16. In some examples, the example activator circuitry 1406 is instantiated by programmable circuitry executing example activator circuitry 1406 instructions and/or configured to perform operations such as those represented by the flowcharts of FIGS. 15 and 16. In some examples, the example controller circuitry 1408 is instantiated by programmable circuitry executing example controller circuitry 1408 instructions and/or configured to perform operations such as those represented by the flowcharts of FIGS. 15 and 16.

In some examples, the example monitoring circuitry 1404 apparatus includes means for monitoring the operating parameters, the example activator circuitry 1406 apparatus includes means for activating the smart-material-based features 220, and the example controller circuitry 1408 apparatus includes means for controlling the smart-material-based features 220. For example, the means for monitoring the operating parameters, activating the smart-material-based features 220, and controlling the smart-material-based features 220 may be implemented by the example monitoring circuitry 1404, the example activator circuitry 1406, and the example controller circuitry 1408, respectively. In some examples, the aforementioned circuitry may be instantiated by programmable circuitry such as the example programmable circuitry 1712 of FIG. 17. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the example full authority digital engine control circuitry 1402 of FIG. 14 is illustrated in FIG. 14, one or more of the elements, processes, and/or devices illustrated in FIG. 14 may be combined, divided, re-arranged, omitted, eliminated, and/or implemented in any other way. Further, the example monitoring circuitry 1404, the example activator circuitry 1406, the example controller circuitry 1408, and/or, more generally, the example full authority digital engine control circuitry 1402 of FIG. 14, may be implemented by hardware alone or by hardware in combination with software and/or firmware. Thus, for example, any of the example monitoring circuitry 1404, the example activator circuitry 1406, the example controller circuitry 1408, and/or, more generally, the example full authority digital engine control circuitry 1402, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example full authority digital engine control circuitry 1402 of FIG. 14 may include one or more elements, processes, and/or devices in addition to, or instead of, those illustrated in FIG. 14, and/or may include more than one of any or all of the illustrated elements, processes and devices.

Flowcharts representative of example machine readable instructions, which may be executed by programmable circuitry to implement and/or instantiate the example full authority digital engine control circuitry 1402 of FIG. 14 and/or representative of example operations which may be performed by programmable circuitry to implement and/or instantiate the example full authority digital engine control circuitry 1402 of FIG. 14, are shown in FIGS. 15 and 16. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowcharts illustrated in FIGS. 15 and 16, many other methods of implementing the example full authority digital engine control circuitry 1402 may alternatively be used. For example, the order of execution of the blocks of the flowcharts may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 15 and 16 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 15 is a flowchart representative of example machine readable instructions and/or example operations 1500 that may be executed, instantiated, and/or performed by programmable circuitry to improve fan operability control using smart materials. The example machine-readable instructions and/or the example operations 1500 of FIG. 15 begin at block 1502, at which the example monitoring circuitry 1404 monitors operating parameters. Operating parameters may include, but are not limited to, at least one of engine pressure, engine vibration, or engine speed. The example monitoring circuitry 1404 monitors the operating parameters by checking against reference values of the operating parameters.

At block 1504, the example monitoring circuitry 1404 determines if there is a deviation from the reference values of the operating parameters. For example, a deviation from the reference values of the operating parameters may represent that an engine not operating to its standard performance. If there is no deviation from the reference values, then the process returns to block 1502. If there is a deviation from the reference values, then the process proceeds to block 1506.

At block 1506, the example activator circuitry 1406 activates the smart-material-based features 220 to mitigate blade flutter and/or stall by changing the air flow. As described above, smart-material-based features 220 may include, but are not limited to, active vortex generators. The smart-material-based features 220 mitigate effects from an engine with deviations from its reference values of the operating parameters. The example activator circuitry 1406 sends a signal to the smart material actuator 226 to activate the smart-material-based features 220 using at least one of electricity, electromagnetic waves, microwaves, or a graphene-based heating element. In some examples, activation of smart-material-based features 220 can occur at a local area to counter detrimental changes (e.g., bend, dent, flutter) in a particular area. Air flow is changed to counter the detrimental changes when the smart-material-based features 220 are activated.

At block 1508, the example controller circuitry 1408 determines if the engine is still in operating to further determine whether to continue monitoring the operating parameters or deactivate the smart-material-based features 220. If the engine is still in operation, the process returns to block 1502 where the example monitoring circuitry 1404 monitors the operating parameters. If the engine is not still in operation, the process proceeds to block 1510.

At block 1510, the example controller circuitry 1408 deactivates the smart-material-based features 220 based on the operation status of the engine. After the smart-material-based features 220 are deactivated, fan operability control is improved using the smart-material-based features 220 by mitigating blade flutter and/or stall.

Turning to FIG. 16, which is a flowchart representative of example machine readable instructions and/or example operations 1600 that may be executed, instantiated, and/or performed by programmable circuitry to improve fan operability control using smart materials and describes in more detail the adjustment of the smart-material-based features 220 based on the adjustment percentage. At block 1602, the example monitoring circuitry 1404 monitors operating parameters. Operating parameters may include, but are not limited to, at least one of engine pressure, engine vibration, or engine speed. The example monitoring circuitry 1404 monitors the operating parameters by checking against reference values of the operating parameters.

At block 1604, the example monitoring circuitry 1404 determines if there is a deviation from the reference values of the operating parameters. For example, a deviation from the reference values of the operating parameters may represent that an engine not operating to its standard performance. If there is no deviation from the reference values, then the process returns to block 1602. If there is a deviation from the reference values, then the process proceeds to block 1606.

At block 1606, the example activator circuitry 1406 activates the smart-material-based features 220 to mitigate blade flutter and/or stall by changing the air flow. As described above, smart-material-based features 220 may include, but are not limited to, active vortex generators. The smart-material-based features 220 mitigate effects from an engine with deviations from its reference values of the operating parameters. The example activator circuitry 1406 sends a signal to the smart material actuator 226 to activate the smart-material-based features 220 using at least one of electricity, electromagnetic waves, microwaves, or a graphene-based heating element. In some examples, activation of smart-material-based features 220 can occur at a local area to counter detrimental changes (e.g., bend, dent, flutter) in a particular area. Air flow is changed to counter the detrimental changes when the smart-material-based features 220 are activated.

At block 1608, the example controller circuitry 1408 determines whether to adjust the smart-material-based features 220 based on the adjustment percentage to mitigate the blade flutter and/or stall more effectively. If the smart-material-based feature is to be adjusted, the process proceeds to block 1610. If the smart-material-based feature is not to be adjusted, the process proceeds to block 1614.

At block 1610, the example controller circuitry 1408 determines an adjustment percentage to mitigate the blade flutter and/or stall more effectively. For example, if the example controller circuitry 1408 determines that the smart-material-based features 220 need to be adjusted slightly, such as by 3%, to mitigate the blade flutter, the example controller circuitry 1408 adjusts the smart-material-based features 220 by that percentage, as described at block 1612.

At block 1612, the example controller circuitry 1408 adjusts the smart-material-based features 220 based on the determined percentage. Mitigation of the blade flutter may be more effective with an adjustment of smart-material-based features 220.

At block 1614, the example controller circuitry 1408 the example controller circuitry 1408 determines if the engine is still in operating to further determine whether to continue monitoring the operating parameters or deactivate the smart-material-based features 220. If the engine is still in operation, the process returns to block 1602. If the engine is not still in operation, the process proceeds to block 1616.

At block 1616, the example controller circuitry 1408 deactivates the smart-material-based features 220. After the smart-material-based features 220 are deactivated, fan operability control is improved using the smart-material-based features 220 by mitigating blade flutter and/or stall (block 1610).

Figure 17:
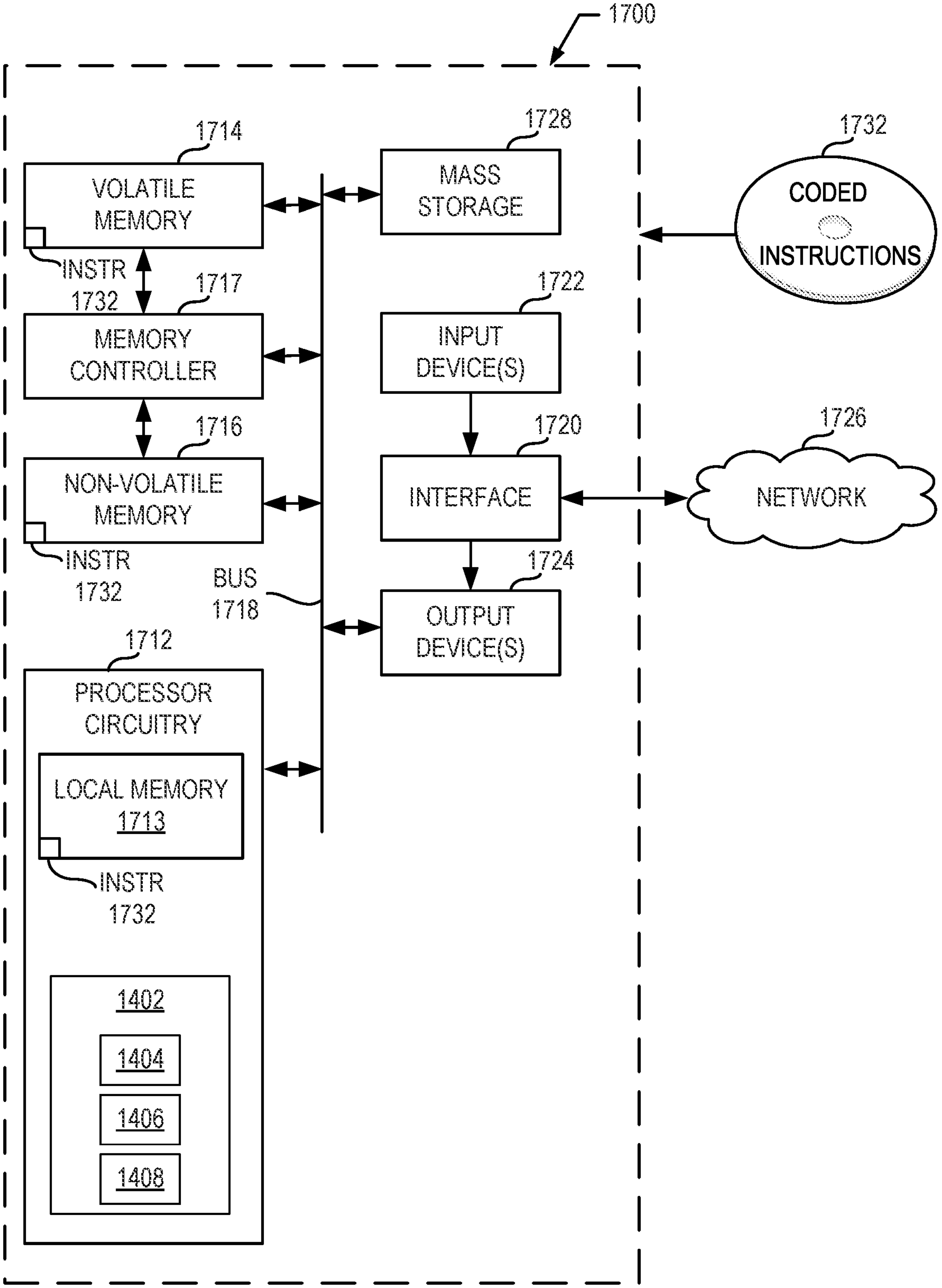
FIG. 17 is a block diagram of an example processing platform including programmable circuitry structured to execute, instantiate, and/or perform the example machine readable instructions and/or perform the example operations of FIGS. 15 and 16 to implement the example full authority digital engine control circuitry of FIG. 14.

FIG. 17 is a block diagram of an example programmable circuitry platform 1700 structured to execute and/or instantiate the example machine-readable instructions and/or the example operations of FIGS. 15 and 16 to implement the example full authority digital engine control circuitry 1402 of FIG. 14. The programmable circuitry platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing and/or electronic device.

The programmable circuitry platform 1700 of the illustrated example includes programmable circuitry 1712. The programmable circuitry 1712 of the illustrated example is hardware. For example, the programmable circuitry 1712 can be implemented by one or more integrated circuits, logic circuits, FPGAs, microprocessors, CPUs, GPUs, DSPs, and/or microcontrollers from any desired family or manufacturer. The programmable circuitry 1712 may be implemented by one or more semiconductor based (e.g., silicon based) devices. In this example, the programmable circuitry 1712 implements the example monitoring circuitry 1404, the example activator circuitry 1406, and the example controller circuitry 1408.

The programmable circuitry 1712 of the illustrated example includes a local memory 1713 (e.g., a cache, registers, etc.). The programmable circuitry 1712 of the illustrated example is in communication with main memory 1714, 1716, which includes a volatile memory 1714 and a non-volatile memory 1716, by a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717. In some examples, the memory controller 1717 may be implemented by one or more integrated circuits, logic circuits, microcontrollers from any desired family or manufacturer, or any other type of circuitry to manage the flow of data going to and from the main memory 1714, 1716.

The programmable circuitry platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1722 are connected to the interface circuitry 1720. The input device(s) 1722 permit(s) a user (e.g., a human user, a machine user, etc.) to enter data and/or commands into the programmable circuitry 1712. The input device(s) 1722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1724 are also connected to the interface circuitry 1720 of the illustrated example. The output device(s) 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1700 of the illustrated example also includes one or more mass storage discs or devices 1728 to store firmware, software, and/or data. Examples of such mass storage discs or devices 1728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1732, which may be implemented by the machine readable instructions of FIGS. 15 and 16, may be stored in the mass storage device 1728, in the volatile memory 1714, in the non-volatile memory 1716, and/or on at least one non-transitory computer readable storage medium such as a CD or DVD which may be removable.

From the foregoing, it will be appreciated that example systems, apparatus, articles of manufacture, and methods have been disclosed that improve fan operability control using smart materials. Disclosed systems, apparatus, articles of manufacture, and methods improve the efficiency of using a computing device by mitigating fan flutter, fan blade denting, and/or non-optimal tip clearance. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to improve fan operability control using smart materials are disclosed herein. Further examples and combinations thereof include the following:

An engine comprising an engine surface in an airflow path, a sensor positioned on the engine surface, and a smart-material-based feature positioned on the engine surface, the smart-material-based feature triggered to modify the airflow path when the sensor outputs an indication of a detected deviation from a reference value of an operating parameter of the engine.

The engine of any preceding clause, wherein the engine surface includes at least one of an inner surface of a fan casing, an outer surface of a fan blade, an inner surface of a nozzle, an outer surface of the nozzle, an inlet guide vane, or an exit guide vane.

The engine of any preceding clause, wherein the engine is ducted, and further including a plurality of smart-material-based features on a plurality of engine surfaces including the inner surface of the fan casing, the outer surface of the fan blade, the inner surface of the nozzle, and the outer surface of the nozzle.

The engine of any preceding clause, wherein the engine further includes at least one of the plurality of smart-material-based features on the inlet guide vane.

The engine of any preceding clause, wherein the engine is unducted, and further including a plurality of smart-material-based features on a plurality of engine surfaces including the outer surface of the fan blade, the inner surface of the nozzle, and the outer surface of the nozzle.

The engine of any preceding clause, wherein the engine is a one-stream engine, a two-stream engine, or a three-stream engine.

The engine of any preceding clause, wherein the smart-material-based feature includes at least one of a shape memory alloy, a bi-metal material, a graphene-based element, or a composite foam.

The engine of any preceding clause, wherein the operating parameter includes at least one of engine pressure, engine vibration, or engine speed.

The engine of any preceding clause, wherein the smart-material-based feature deactivates when the engine is not in operation.

The engine of any preceding clause, wherein the smart-material-based feature adjusts by an adjustment percentage.

The engine of any preceding clause, wherein the smart-material-based feature includes an active vortex generator.

The engine of any preceding clause, wherein the active vortex generator is retractable.

The engine of any preceding clause, further including a controller and a smart material actuator, the controller sending a signal to the smart material actuator to activate the smart-material-based feature when the sensor outputs the indication of the deviation from the reference value of the operating parameter.

The engine of any preceding clause, wherein the sensor sends the signal to the controller when the sensor outputs the indication of the deviation from the reference value of the operating parameter.

The engine of any preceding clause, wherein the smart material actuator activates the smart-material-based feature using at least one of electricity, electromagnetic waves, microwaves, or a graphene-based heating element.

The engine of any preceding clause, wherein the smart-material-based feature creates at least one of a serration or a bump on the engine surface when the smart material actuator receives the signal to activate.

The engine of any preceding clause, wherein the smart material actuator activates the smart-material-based feature to create the at least one of the serration or the bump at a local area of the engine surface.

A non-transitory machine readable storage medium comprising instructions to cause programmable circuitry to at least monitor an operating parameter of an engine, activate a smart-material-based feature when a sensor outputs an indication of a detected deviation from a reference value of the operating parameter, and control the smart-material-based feature triggered to modify an airflow path of the engine.

The non-transitory machine readable storage medium of any preceding clause, wherein the operating parameter includes at least one of engine pressure, engine vibration, or engine speed.

The non-transitory machine readable storage medium of any preceding clause, wherein the sensor sends a signal to a controller when the sensor outputs the indication of the deviation from the reference value of the operating parameter.

The non-transitory machine readable storage medium of any preceding clause, wherein the controller sends a signal to a smart material actuator to activate the smart-material-based feature.

The non-transitory machine readable storage medium of any preceding clause, wherein the smart-material-based feature creates at least one of a serration or a bump on an engine surface when the smart material actuator receives the signal to activate.

A turbofan engine comprising a fan casing having an inner surface, the inner surface defining a flowpath, a fan blade in the flowpath, a nozzle having an inner surface and an outer surface, and a smart-material-based feature positioned in the flowpath on at least one of the inner surface of the fan casing, an exterior surface of the fan blade, the inner surface of the nozzle, or the outer surface of the nozzle, the smart-material-based feature to, when actuated, modify a flow of air in the flowpath.

The turbofan engine of any preceding clause, wherein the turbofan engine is a two-stream turbofan engine or a three-stream turbofan engine.

The turbofan engine of any preceding clause, wherein the smart-material-based feature includes at least one of a shape memory alloy, a bi-metal material, a graphene-based element, or a composite foam.

The turbofan engine of any preceding clause, further including an inlet guide vane, wherein the smart-material-based feature is positioned in the flowpath on the inlet guide vane.

The turbofan engine of any preceding clause, further including a sensor, the sensor monitoring an operating parameter of the turbofan engine for a deviation from a reference value of an operating parameter.

The turbofan engine of any preceding clause, wherein the operating parameter includes at least one of engine pressure, engine vibration, or engine speed.

The turbofan engine of any preceding clause, wherein the smart-material-based feature includes an active vortex generator.

The turbofan engine of any preceding clause, wherein the active vortex generator is retractable.

The turbofan engine of any preceding clause, further including a controller and a smart material actuator, the controller sending a signal to the smart material actuator to activate the smart-material-based feature when the sensor monitors the deviation from the reference value of the operating parameter.

The turbofan engine of any preceding clause, wherein the sensor sends a signal to the controller when the sensor monitors the deviation from the reference value of the operating parameter.

The turbofan engine of any preceding clause, wherein the smart material actuator activates the smart-material-based feature using at least one of electricity, electromagnetic waves, microwaves, or a graphene-based heating element.

The turbofan engine of any preceding clause, wherein the smart-material-based feature creates at least one of a serration or a bump on at least one of the inner surface of the fan casing, the exterior surface of the fan blade, the inner surface of the nozzle, the outer surface of the nozzle, or the inlet guide vane when the smart material actuator receives the signal to activate.

The turbofan engine of any preceding clause, wherein the smart-material-based feature activates the active vortex generator when the smart material actuator receives the signal to activate.

An unducted gas turbine engine comprising a fan blade having an exterior surface in a flowpath, a nozzle having an inner surface and an outer surface, and a smart-material-based feature positioned in the flowpath on at least one of the exterior surface of the fan blade, the inner surface of the nozzle, or the outer surface of nozzle, the smart-material-based feature to, when actuated, modify a flow of air in the flowpath.

The unducted gas turbine engine of any preceding clause, wherein the unducted gas turbine engine is a two-stream gas turbine engine or a three-stream gas turbine engine.

The unducted gas turbine engine of any preceding clause, wherein the smart-material-based feature includes at least one of a shape memory alloy, a bi-metal material, a graphene-based element, or a composite foam.

The unducted gas turbine engine of any preceding clause, further including an exit guide vane, wherein the smart-material-based feature is positioned in the flowpath on at least one of the exit guide vane.

The unducted gas turbine engine of any preceding clause, wherein the smart-material-based feature includes an active vortex generator.

The unducted gas turbine engine of any preceding clause, wherein the active vortex generator is retractable.

The unducted gas turbine engine of any preceding clause, further including a sensor, the sensor monitoring an operating parameter of the unducted gas turbine engine for a deviation from a reference value of an operating parameter.

The unducted gas turbine engine of any preceding clause, wherein the operating parameter includes at least one of engine pressure, engine vibration, or engine speed.

The unducted gas turbine engine of any preceding clause, further including a controller and a smart material actuator, the controller sending a signal to the smart material actuator to activate the smart-material-based feature when the sensor monitors the deviation from the reference value of the operating parameter.

The unducted gas turbine engine of any preceding clause, wherein the sensor sends a signal to the controller when the sensor monitors the deviation from the reference value of the operating parameter.

The unducted gas turbine engine of any preceding clause, wherein the smart material actuator activates the smart-material-based feature using at least one of electricity, electromagnetic waves, microwaves, or a graphene-based heating element.

The unducted gas turbine engine of any preceding clause, wherein the smart-material-based feature creates at least one of a serration or a bump on at least one of exterior surface of the fan blade, at least one of exit guide vane, or at least one of the inner surface or outer surface of the nozzle when the smart material actuator receives the signal to activate.

The unducted gas turbine engine of any preceding clause, wherein the smart-material-based feature activates the active vortex generator when the smart material actuator receives the signal to activate.

A turbofan engine comprising a fan casing having an inner surface, the inner surface defining a flowpath, a fan blade in the flowpath, a nozzle having an inner surface and an outer surface, an inlet guide vane, and a smart-material-based feature positioned in the flowpath on at least one of the inner surface of the fan casing, an exterior surface of the fan blade, the inner surface of the nozzle, the outer surface of the nozzle, or the inlet guide vane, the smart-material-based feature to, when actuated, modify a flow of air in the flowpath.

The turbofan engine of any preceding clause, wherein the turbofan engine is a two-stream turbofan engine or a three-stream turbofan engine.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An engine comprising:

an engine surface in an airflow path;

a sensor positioned on the engine surface; and a smart-material-based feature positioned on the engine surface, the smart-material-based feature triggered to create surface features on the engine surface to modify the airflow path when the sensor outputs an indication of a detected deviation from a reference value of an operating parameter of the engine.

2. The engine of claim 1, wherein the engine surface includes at least one of an inner surface of a fan casing, an outer surface of a fan blade, an inner surface of a nozzle, an outer surface of the nozzle, an inlet guide vane, or an exit guide vane.

3. The engine of claim 2, wherein the engine is ducted, and further including a plurality of smart-material-based features on a plurality of engine surfaces including the inner surface of the fan casing, the outer surface of the fan blade, the inner surface of the nozzle, and the outer surface of the nozzle.

4. The engine of claim 3, wherein the engine further includes at least one of the plurality of smart-material-based features on the inlet guide vane.

5. The engine of claim 2, wherein the engine is unducted, and further including a plurality of smart-material-based features on a plurality of engine surfaces including the outer surface of the fan blade, the inner surface of the nozzle, and the outer surface of the nozzle.

6. The engine of claim 1, wherein the engine is a one-stream engine, a two-stream engine, or a three-stream engine.

7. The engine of claim 1, wherein the smart-material-based feature includes at least one of a shape memory alloy, a bi-metal material, a graphene-based element, or a composite foam.

8. The engine of claim 1, wherein the operating parameter includes at least one of engine pressure, engine vibration, or engine speed.

9. The engine of claim 1, wherein the smart-material-based feature deactivates when the engine is not in operation.

10. The engine of claim 1, wherein the smart-material-based feature adjusts by an adjustment percentage.

11. The engine of claim 1, wherein the smart-material-based feature includes an active vortex generator.

12. The engine of claim 11, wherein the active vortex generator is retractable.

13. The engine of claim 1, further including a controller and a smart material actuator, the controller sending a signal to the smart material actuator to activate the smart-material-based feature when the sensor outputs the indication of the detected deviation from the reference value of the operating parameter.

14. The engine of claim 13, wherein the sensor sends the signal to the controller when the sensor outputs the indication of the detected deviation from the reference value of the operating parameter.

15. The engine of claim 13, wherein the smart material actuator activates the smart-material-based feature using at least one of electricity, electromagnetic waves, microwaves, or a graphene-based heating element.

16. The engine of claim 13, wherein the surface features include at least one of a serration or a bump, and the smart-material-based feature creates the surface features on the engine surface when the smart material actuator receives the signal to activate.

17. The engine of claim 16, wherein the smart material actuator activates the smart-material-based feature to create the at least one of the serration or the bump at a local area of the engine surface.

18. A non-transitory machine readable storage medium comprising instructions to cause programmable circuitry to at least:

monitor an operating parameter of an engine;

activate a smart-material-based feature when a sensor outputs an indication of a detected deviation from a reference value of the operating parameter; and control the smart-material-based feature to create surface features on an engine surface to modify an airflow path of the engine.

19. The non-transitory machine readable storage medium of claim 18, wherein the operating parameter includes at least one of engine pressure, engine vibration, or engine speed.

20. The non-transitory machine readable storage medium of claim 18, wherein the sensor sends a signal to a controller when the sensor outputs the indication of the detected deviation from the reference value of the operating parameter.

* * * * *